US012450967B2

(12) United States Patent
Danhof et al.

(10) Patent No.: US 12,450,967 B2
(45) Date of Patent: Oct. 21, 2025

(54) SENSOR FOR VERIFYING VALUE DOCUMENTS

(71) Applicant: GIESECKE+DEVRIENT CURRENCY TECHNOLOGY GMBH, Munich (DE)

(72) Inventors: Julia Danhof, Egling a.d. Paar (DE); Henning Geiseler, Munich (DE); Wolfgang Deckenbach, Schechen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 266 days.

(21) Appl. No.: 18/546,463

(22) PCT Filed: Feb. 15, 2022

(86) PCT No.: PCT/EP2022/025049
§ 371 (c)(1),
(2) Date: Aug. 15, 2023

(87) PCT Pub. No.: WO2022/174978
PCT Pub. Date: Aug. 25, 2022

(65) Prior Publication Data
US 2024/0127657 A1 Apr. 18, 2024

(30) Foreign Application Priority Data
Feb. 16, 2021 (DE) ..................... 10 2021 000 807.3

(51) Int. Cl.
*G07D 7/1205* (2016.01)
*G07D 7/121* (2016.01)
*G07D 7/20* (2016.01)

(52) U.S. Cl.
CPC ........... *G07D 7/1205* (2017.05); *G07D 7/121* (2013.01); *G07D 7/2075* (2013.01)

(58) Field of Classification Search
CPC ..... G07D 7/1205; G07D 7/121; G07D 7/2075
See application file for complete search history.

(56) References Cited

U.S. PATENT DOCUMENTS 6,686,074 B2 * 2/2004 Muth ................. C09K 11/7771 252/301.5
6,841,092 B2 * 1/2005 Paeschke ................. G07D 7/12 283/92

(Continued)

FOREIGN PATENT DOCUMENTS

DE 102010014912 A1 10/2011
DE 102012025263 A1 6/2014

(Continued)

OTHER PUBLICATIONS

German Search Report from corresponding German Patent Application No. DE102021000807.3, Nov. 8, 2021.

(Continued)

*Primary Examiner* — Mohamed K Amara
(74) *Attorney, Agent, or Firm* — Workman Nydegger

(57) ABSTRACT

A sensor for verifying value documents and designed to determine the luminescence time constant of a value document that is moved past the sensor for verification purposes, and the provision of a velocity correction of the luminescence time constant of the value document in the sensor. The relative movement between the value document and the sensor causes movement effects, resulting in a distortion of the intensity curve from which the luminescence time constant is derived. The luminescence time constant is corrected using a sensor-specific corrective factor ascertained for the velocity of the movement of the value document during the verification process. For this purpose, different sensor-specific corrective factors are used for different examples of (Continued)

sensors that are nominally identical in design and are part of the same sensor production series.

21 Claims, 2 Drawing Sheets

(56) References Cited

U.S. PATENT DOCUMENTS

| | | | | |
|---|---|---|---|---|
| 8,361,385 | B2 * | 1/2013 | Glezer | B01L 3/50855 422/50 |
| 9,878,573 | B2 * | 1/2018 | Giering | C09K 11/71 |
| 9,987,874 | B2 * | 6/2018 | Giering | G01N 21/6447 |
| 9,989,411 | B2 | 6/2018 | Deckenbach et al. | |
| 11,467,087 | B2 | 10/2022 | Sato et al. | |
| 12,194,772 | B2 * | 1/2025 | Kecht | B42D 25/382 |
| 2005/0178841 | A1 * | 8/2005 | Jones, II | G06K 7/12 235/491 |
| 2015/0198528 | A1 * | 7/2015 | Manneh | G01N 21/6408 506/4 |
| 2015/0348351 | A1 | 12/2015 | Deckenbach et al. | |
| 2021/0116370 | A1 | 4/2021 | Sato et al. | |
| 2021/0209886 | A1 | 7/2021 | Kure et al. | |
| 2024/0241032 | A1 * | 7/2024 | Stoev | B01L 3/502761 |

FOREIGN PATENT DOCUMENTS

| | | | |
|---|---|---|---|
| EP | 3754619 | A2 | 12/2020 |
| EP | 3839902 | A1 | 6/2021 |
| WO | 2018181134 | A1 | 10/2018 |
| WO | 2020059610 | A1 | 3/2020 |

OTHER PUBLICATIONS

International Search Report from corresponding PCT Application No. PCT/EP2022/025049, Jun. 28, 2022.

* cited by examiner

SENSOR FOR VERIFYING VALUE DOCUMENTS

BACKGROUND

The invention relates to a sensor for verifying value documents, which sensor is designed for determining a luminescence time constant of a value document, and the provision of a velocity correction of the luminescence time constant in the sensor.

Value documents are verified usually using sensors which determine the type of the value documents and/or which verify the value documents in regard to authenticity or in regard to the state thereof. The value documents are verified in an apparatus for value document processing which contains one or a plurality of different sensors, depending on the value document properties to be verified. In order to verify the value documents, the latter are usually transported past the stationary sensor.

A value document to be verified may comprise one or a plurality of luminescent materials, in respect of which for example the decay time of the temporal intensity profile of the luminescence or spectral properties of the luminescence is/are verified. The luminescent materials of the value document may be present regionally or over the entire surface on or in the value document. In order to check the decay time of the luminescence, it is known to illuminate value documents with light pulses and, in the dark phase between the light pulses, to detect the luminescence intensity of the value document at different times after the end of the excitation pulse. The decay time of the luminescence is then determined for example from the decay of the luminescence intensity over time. It is also known to use such a luminescence time constant for verifying the authenticity of value documents.

What is disadvantageous about value document verification in the prior art is that in the case of a high transport velocity of the value document, a temporal intensity profile of the luminescence is detected which is corrupted in comparison with a statically detected intensity profile. Therefore, the luminescence time constant can only be determined inaccurately at high transport velocities of the value document.

SUMMARY

It is an object of the present invention to provide a sensor for verifying value documents which enables the luminescence time constant of the luminescence of a value document to be checked at high transport velocities with improved accuracy.

If the luminescence of the value document is detected statically, i.e. without relative movement between the value document and the sensor, then the detected intensity profile of the luminescence is not corrupted by movement effects. A luminescence time constant can then be ascertained directly from the statically detected intensity profile as a function of time. With stationary value documents, there is good correspondence between the measured luminescence time constants for different sensor specimens of a sensor type series and for the same sensor specimen in different installation positions.

In the case of a relative movement between value document and sensor, however, the detected intensity profile is corrupted on account of movement effects. In the case of sensors used on fast value document processing apparatuses, the value document is displaced during the measurement by a length comparable with the size of the detection region and the illumination region of the sensor. Since that region of the value document which is excited to luminescence is partly transported out of the (stationary) detection region during detecting, this results in a corruption of the measured intensity profile from which the luminescence time constant is then derived. The actual time constant of the luminescent material can be determined accurately, however, by correcting the movement-dictated portion.

In the preliminary stages of the invention, it was also established, surprisingly, that during the detection of the luminescence time constant on fast value document processing apparatuses, in the case of different sensor specimens of the same sensor type series, measurement errors of different magnitudes occur which restrict the comparability of the luminescence time constants measured by different sensor specimens. It was found that for different, nominally structurally identical sensor specimens of the same sensor type series, systematic measurement errors occur during a relative movement between sensor and value document even though the time constants measured by these sensors correspond accurately during the static measurement. These systematic measurement errors are attributed to geometric tolerances in the position and the angle of the illumination and of the detector and have not been corrected heretofore in the verification of value documents.

In the preliminary stages of the invention, it was recognized that it is not sufficient to carry out the correction of the luminescence time constants in relation to the transport velocity sensor-generally, i.e. in the same way for all sensor specimens of a sensor type series, only depending on the transport velocity of the value document. According to the invention, rather, a sensor-specific correction of the measured luminescence time constant is carried out depending on the transport velocity. In other words, the correction of the luminescence time constants is not carried out identically for all sensor specimens of a type series, rather different correction factors are used for different, nominally structurally identical sensor specimens.

Heretofore, however, individual adjustment of the sensors has not been effected with regard to the luminescence time constant, but rather only with regard to the measured signal intensity. For this purpose, the respective sensor is mounted in a measuring station, and a reference medium is transported past the sensor at the target distance in order to measure the intensity of its luminescence. On the basis thereof, the sensor is calibrated in relation to the signal intensity.

The sensor according to the invention is configured for verifying the luminescence of value documents which, for their verification, are transported past the sensor along a transport direction at a verification transport velocity. The sensor is configured for measuring the change over time in the luminescence of the value document while the value document is transported past, and also for determining a luminescence time constant of the respective value document on the basis of the measured change over time in the luminescence.

The sensor comprises at least one excitation light source for exciting a luminescence of the value document, and at least one photodetector for detecting the luminescence of the value document excited by the excitation light source. The sensor is configured to measure the change over time in the luminescence of the value document while the value document is transported past the sensor, by means of the photodetector. The sensor comprises an evaluation device designed to determine a luminescence time constant of the value document at the verification transport velocity on the basis of the measured change over time in the luminescence of the value document. For this purpose, the evaluation device comprises corresponding software, for example. In order to verify the value document, the sensor verifies the luminescence time constant, e.g. for an authenticity verification of the value document.

The value document to be verified comprises a security feature containing one or more luminescent materials which emit luminescence. As a reaction to the luminescence excitation of the excitation light source, the security feature emits a luminescence at one or more wavelengths. The luminescence as a function of time t has an intensity profile I(t) with a luminescence time constant t. The luminescence excitation is achieved e.g. by means of an excitation pulse A directed at the value document by the excitation light source. The intensity profile I(t) then usually has in each case a build-up of the luminescence intensity during the excitation pulse A of the luminescence excitation and a decay of the luminescence intensity after the end of the excitation pulse of the luminescence excitation.

In order to correct the luminescence time constant in relation to the transport velocity of the value document to be verified, the sensor comprises a correction device. A velocity correction is/has been provided in the correction device, which velocity correction corrects a luminescence time constant determined for the respective value document during the verification of the luminescence of the value document by means of the sensor. One or more sensor-specific parameter(s) applicable specifically to the respective sensor, i.e. specifically to the respective sensor specimen, are or have been stored in the sensor. The velocity correction is contained in the correction device of the sensor. The correction device can be a processor. The velocity correction can be carried out by software of the correction device.

In order to correct the luminescence time constant of the value document to be verified in relation to the transport velocity, the correction device is configured, on the basis of the at least one sensor-specific parameter stored in the sensor, by means of information made available to the sensor regarding the verification transport velocity, to determine a sensor-specific correction factor which is applicable to the verification transport velocity of the value document. For different verification transport velocities, different values are determined for the sensor-specific correction factor depending on the verification transport velocity.

The information regarding the verification transport velocity of the value document can be communicated to the sensor by the value document processing apparatus or can be determined by the sensor itself by measurement. It can be stored in the sensor. The sensor-specific parameter can be stored in the sensor e.g. in a memory area of the correction device or in some other memory of the sensor outside the correction device.

The correction device is configured to correct the luminescence time constant determined for the value document with the aid of the at least one sensor-specific correction factor applicable to the verification transport velocity of the value document in order to determine a corrected luminescence time constant for the value document. In order to correct the luminescence time constant determined for the value document, the luminescence time constant determined for the value document is computed with, e.g. multiplied or divided by, the sensor-specific correction factor applicable to the verification transport velocity of the value document.

The luminescence time constant determined on the basis of the measured change over time in the luminescence can optionally additionally also be corrected by means of a further, sensor-general correction before or after the sensor-specific correction according to the invention is carried out.

The sensor, in particular the evaluation device, is designed to verify the luminescence of the respective value document on the basis of the corrected luminescence time constant. For this purpose, the corrected luminescence time constant can be compared with one or more reference value(s) or threshold(s) expected for the respective luminescent material of the value document, e.g. for an authenticity verification of the value document.

According to the invention, therefore, a sensor-specific correction of the measured luminescence time constants is carried out depending on the transport velocity of the value documents. The luminescence time constants which are corrected in this way and which are determined by different sensor specimens of the same type series and/or the same sensor specimen in different installation positions no longer have any movement-dictated errors and can thus be compared directly with one another and/or with a specified target value of the luminescence time constants. In the case of the comparison with the specified target value, a narrow acceptance range around the target value can be chosen here—in contrast to luminescence time constants which are corrupted in a movement-dictated manner or are only corrected sensor-generally, for which a relatively large acceptance range around the target value has to be permitted.

The luminescence time constant of the value document to be verified can be determined in the evaluation device of the sensor on the basis of the measured change over time in the luminescence of the value document to be verified and can be communicated to the correction device in order that the latter carries out the velocity correction. The corrected luminescence time constant can subsequently be communicated by the correction device to the evaluation device in order that the latter carries out a verification of the value document on the basis of the corrected luminescence time constant. The correction device can be part of the evaluation device of the sensor, which evaluation device is designed to determine the luminescence time constant of the value document to be verified on the basis of the measured change over time in the luminescence of the value document to be verified, and to verify the value document on the basis of the luminescence time constant corrected by the correction device. Alternatively, the correction device can also be present in the sensor separately from the evaluation device.

The sensor-specific parameter is characteristic of or dependent on an (spatial) offset along the transport direction of the value document between the illumination region, in which the value document to be verified by the sensor is excited to luminescence or in which the excitation light source of the sensor excites the value document, and a detection region, in which the luminescence of the value document to be verified is detected by the sensor or in which the at least one photodetector detects the luminescence of the value document. The illumination region and the detection region are located in the measurement plane of the sensor and are preferably of approximately the same size and overlap one another for the most part.

The sensor-specific parameter is determined on the basis of a (at least one) measurement at the sensor (i.e. at the respective sensor specimen) or on the basis of a (at least one) measurement with the aid of the sensor (i.e. with the aid of the respective sensor specimen). For example, the sensor-specific parameter can be determined on the basis of a measurement at the sensor in advance of the value document verification, e.g. by measurement of the offset length of the sensor concerning the optical set-up of the sensor. Alternatively, the sensor-specific parameter can also be determined on the basis of at least one measurement carried out by the sensor itself in advance of the value document verification, e.g. by measurement of the luminescence time constant of at least one reference medium by means of the sensor and calculation of a specific sensor-specific correction factor K(v0) or a sensor-specific offset parameter a from the measured luminescence time constant.

In the present application, the term sensor-specific means that something is specific to the respective sensor specimen; for example, sensor-specific parameter/correction factor means that the respective sensor-specific parameter/correction factor is specific, i.e. unique, to the respective sensor specimen, wherein the sensor-specific parameters/correction factors of the individual (nominally structurally identical) sensor specimens of the same sensor type series differ from one another. The sensor-specific parameter(s)/correction factor(s) is/are determined in a manner specific to each sensor specimen. The sensor-specific parameter stored in the sensor is determined in a manner specific to the respective sensor, i.e. to the respective sensor specimen, e.g. before the value document verification (e.g. before delivery of the sensor or during calibration of the sensor in the value document processing apparatus).

Correction Assignment

In order to enable the velocity correction of the luminescence time constant of a value document in the case of different verification transport velocities during the value document verification, a sensor-generally applicable correction assignment, e.g. an offset value assignment D or correction table T or correction formula F, can be or have been stored in the sensor. The correction assignment, in particular offset value assignment D or correction table T or correction formula F, is applicable sensor-generally to all sensors of the same sensor type series equally. The correction assignment assigns in each case an offset-dictated correction factor to different possible transport velocities of the value document to be verified, for different possible sensor-specific offset values of the sensor (e.g. offset lengths d1, d2, . . . or offset parameters a1, a2, . . . ), which correction factor is applicable to the respective offset value and the respective transport velocity. During the velocity correction of the luminescence time constant it is then provided that on the basis of the correction assignment, in particular offset value assignment D or correction table T or correction formula F, with the aid of the sensor-specific parameter stored in the sensor, the sensor-specific correction factor is determined which is applicable to the verification transport velocity of the value document, e.g. by selection of the correct correction factor from the table or by calculation on the basis of the correction formula. For all verification transport velocities vP, exactly the sensor-specific correction factor K(vP) associated with this velocity can be calculated in a simple manner using the correction formula. The velocity correction of the luminescence time constant is then carried out with the aid of the sensor-specific correction factor which was determined on the basis of the correction assignment.

By way of example, the correction assignment stored in the sensor corresponds to a table which—for different possible offset values of the sensor—assigns in each case an offset-dictated correction factor to in each case a plurality of discrete transport velocities, or a mathematical function which—for different possible offset values of the sensor—assigns in each case an offset-dictated correction factor to the respective transport velocity in each case in at least one continuous interval of transport velocities. By way of example, the correction assignment indicates the offset-dictated correction factors for two mutually opposite transport directions of the value document to be verified relative to the sensor, e.g. for positive and negative possible transport velocities and/or for positive and negative offset values. A correction assignment in the form of a table can be determined mathematically by calculation of the movement-dictated change over time in the overlap between the illumination region and the detection region on the value document, or it can be determined on the basis of measurements of the luminescence time constant of a reference medium by means of one or more reference sensor(s) (at different transport velocities of the reference medium).

Examples of the Sensor-Specific Parameter

By way of example, the sensor-specific parameter stored in the sensor is a specific sensor-specific correction factor K(v0) which is applicable specifically to the respective sensor and to a reference transport velocity v0. Preferably, the value of the reference transport velocity v0 is then also stored in the sensor. During the velocity correction of the luminescence time constant determined for the respective value document, provision can then be made for determining the sensor-specific correction factor which is applicable to the verification transport velocity of the value document to be verified in each case on the basis of the correction assignment and also on the basis of the value of the reference transport velocity v0 and on the basis of the specific sensor-specific correction factor K(v0) linked with the reference transport velocity and by means of the information made available to the sensor regarding the verification transport velocity of the value document. In particular, the sensor-specific correction factor K(vP) is determined only on the basis of this (exactly one) specific sensor-specific correction factor K(v0) ascertained with the aid of the (same) sensor specimen for the reference transport velocity v0, without the use of further sensor-specific correction factors applicable to other transport velocities.

However, the sensor-specific parameter stored in the sensor can also be a sensor-specific offset value of the sensor, which is a measure of the sensor-specific (spatial) offset between the illumination region and the detection region of the sensor along the transport direction of the value document. In the case of an offset value stored in the sensor, the correction assignment stored in the sensor is preferably an offset value assignment (offset value table D or corresponding mathematical function) which indicates for a plurality of offset values in each case the offset-dictated correction factor applicable to the respective offset value as a function of the transport velocity of the value document. On the basis of the sensor-specific offset value, it is possible, on the basis of the offset value assignment and by means of the information made available to the sensor regarding the verification transport velocity of the value document, to determine the sensor-specific correction factor which is applicable to the verification transport velocity of the value document to be verified in each case.

The sensor-specific offset value is e.g. a sensor-specific offset parameter a which was determined e.g. on the basis of the specific sensor-specific correction factor K(v0) and the reference transport velocity v0 and is applicable specifically to the respective sensor (to the respective sensor specimen). It is possible for the sensor-specific offset parameter a to have been determined before the value document verification (e.g. before delivery of the sensor or during calibration of the sensor in the value document processing apparatus).

However, the sensor-specific offset value can also be a sensor-specific offset length d of the sensor, which indicates the distance along the transport direction of the value document between the illumination region and the detection region of the sensor, e.g. the distance between the center point or centroid of the illumination region and the center point or centroid of the detection region. The sensor-specific offset length d stored in the sensor can be determined by means of a measurement of the sensor which is carried out at the sensor with the aid of at least one other measuring instrument (e.g. ruler).

The provision of the velocity correction is carried out for a plurality of sensor specimens of the same sensor type series, wherein the sensor-specific parameter, in particular the specific sensor-specific correction factor K(v0) or the sensor-specific offset value (e.g. offset parameter a or offset length d), is determined in a manner specific to each sensor specimen or is applicable specifically to the respective sensor specimen. For different, nominally structurally identical sensor specimens of the same sensor type series, the sensor-specific parameters, in particular the specific sensor-specific correction factors K(v0) or the sensor-specific offset values (e.g. offset parameter a or offset length d), differ from one another.

Sensor-Generally Applicable Correction Factor

In the sensor, a velocity dependence of a (non-sensor-specific) sensor-generally applicable (ideal) correction factor can also be stored, e.g. in the form of discrete value pairs or as a mathematical function which assigns in each case a sensor-generally applicable (ideal) correction factor to a plurality of transport velocities of a value document to be verified. By way of example, the sensor-generally applicable correction factor serves for correcting the measured luminescence time constant with regard to the displacement—occurring equally on all sensors of a type series—of the excited region of the value document relative to the detection region of the sensor, said displacement being dependent on the transport velocity.

The sensor-generally applicable correction factor applicable to the verification transport velocity of the value document can be used for the velocity correction of the luminescence time constant determined for the respective value document. For example, the sensor-specific correction factor can be calculated with the aid of the sensor-generally applicable correction factor or the two correction factors (the sensor-specific correction factor and the sensor-generally applicable correction factor) are multiplied by one another for the velocity correction. During the velocity correction of the luminescence time constant determined for the respective value document, it can be provided that the luminescence time constant determined for the value document is corrected with the aid of the sensor-specific correction factor applicable to the verification transport velocity of the value document and additionally with the aid of the sensor-generally applicable correction factor applicable to the verification transport velocity of the value document, in order to determine the corrected luminescence time constant of the value document.

The sensor-generally applicable correction factor is independent of the offset between illumination region and detection region of the respective sensor and would be sufficient for the velocity correction of the luminescence time constant—that is to say that no sensor-specific velocity correction of the luminescence time constant would be necessary—if the sensor had no spatial offset, or exactly the spatial offset fixedly predefined for the type series of the sensor, between its illumination region and its detection region along the transport direction of the value document. The sensor-generally applicable (ideal) correction factor is thus applicable to an ideal sensor which belongs to the same sensor type series, but has no offset, or exactly the predefined offset, between an illumination region and a detection region of the sensor. The sensor-generally applicable correction factor is equally also applicable to the other sensors (sensor specimens) of the sensor type series to which the abovementioned sensor belongs, and can also be used for the velocity correction of the luminescence time constant in the other sensor specimens of this sensor type series.

Sensor-Specific Parameter Determined by Means of Reference Medium

In order to determine the at least one sensor-specific parameter, it is possible—in a manner specific to each sensor specimen of the sensor type series—to carry out in particular the following steps:

a1) transporting a reference medium provided with a reference luminescent material past the sensor at a reference transport velocity v0 along a transport direction, wherein the reference luminescent material has a specified luminescence time constant tR0 or is excitable to luminescence with the specified luminescence time constant tR0, and a2) measuring the change over time in the luminescence of the reference luminescent material by means of the sensor at the reference transport velocity v0 while the reference medium is transported past, and a3) determining a reference medium time constant tR(v0) of the reference luminescent material for the reference transport velocity v0 on the basis of the change over time in the luminescence of the reference medium measured at the reference transport velocity v0, and a4) determining a specific sensor-specific correction factor K(v0) applicable to the reference transport velocity v0 on the basis of the determined reference medium time constant tR(v0) of the reference luminescent material and on the basis of the specified luminescence time constant tR0 of the reference luminescent material.

For this purpose, it is possible to use a single reference medium or a plurality of reference media, the measured time constant of which is averaged in order to determine the reference medium time constant. These reference media can be authentic value documents or sheets provided with luminescent material and prepared specifically for this purpose.

Determining the reference medium time constant of the reference medium can be carried out with the aid of the sensor before delivery of the sensor by the sensor manufacturer. This has the advantage that after delivery the sensor can be put into operation in different value document processing apparatuses with little effort. Alternatively, determining the reference medium time constant of the reference medium can be carried out after the delivery of the sensor during a calibration of the sensor in the value document processing apparatus. This has the advantage that offset-dependent effects that only arise as a result of installation in the value document processing apparatus are compensated for, and a particularly accurate verification of value documents by the sensor is thus possible.

When storing the at least one sensor-specific parameter, in particular the following steps b1) or b2) can be carried out:

b1) storing the specific sensor-specific correction factor K(v0) applicable to the reference transport velocity v0 and optionally a value of the reference transport velocity v0 in the sensor, wherein the specific sensor-specific correction factor K(v0) is the sensor-specific parameter stored in the sensor. However, it is also possible for the value of the reference transport velocity v0 to have already been stored in the sensor previously.

b2) storing a sensor-specific offset parameter a in the sensor, which was determined on the basis of the specific sensor-specific correction factor K(v0) and the value of the reference transport velocity v0, wherein the sensor-specific offset parameter a is the sensor-specific parameter stored in the sensor. The sensor-specific offset parameter is one example of the sensor-specific offset value specified above. It can be determined e.g. before delivery of the sensor by the manufacturer or afterward during calibration of the sensor in the value document processing apparatus.

When providing the velocity correction, the correction device for the velocity correction of the luminescence time constant of the respective value document is configured in particular to determine the sensor-specific correction factor K(vP) applicable to the verification transport velocity vP of the value document to be verified in each case by means of information made available to the sensor regarding the verification transport velocity vP of the value document and to determine it either on the basis of the value of the reference transport velocity v0 stored in the sensor and of the specific sensor-specific correction factor K(v0) stored in the sensor, or to determine it on the basis of the sensor-specific offset parameter a of the sensor stored in the sensor.

The sensor-specific offset parameter a of the sensor is a measure of an (spatial) offset along the transport direction of the value document between the illumination region and the detection region of the sensor, and corresponds to the abovementioned offset length, in particular.

The specific sensor-specific correction factor K(v0) of the sensor is a measure of the reference medium time constant tR(v0) of the reference medium determined for the reference transport velocity v0 in step a3). In order to determine the specific sensor-specific correction factor K(v0) applicable to the reference transport velocity v0 in step a4), the specified luminescence time constant of the reference luminescent material tR0 and the reference medium time constant tR(v0) determined for the reference transport velocity v0 in step a3) can be expressed in a relationship with respect to one another.

Preferably, the target value of the luminescence time constant of the value document to be verified by the sensor deviates from the specified luminescence time constant tR0 of the reference luminescent material of the reference medium at most by 50%, preferably at most by 30%, in order to achieve as accurate a velocity correction as possible. Particularly preferably, the luminescence time constant of the value documents to be verified by the sensor corresponds at least approximately to the specified luminescence time constant of the reference medium. A very accurate velocity correction is achieved as a result.

The specified luminescence time constant tR0 of the reference medium originates from a data sheet or a static measurement of the reference medium. By way of example, for the reference medium a reference luminescent material having a time constant of 100 µs is used for value document luminescent materials having a time constant of between 60 µs and 160 µs, a reference luminescent material having a time constant of 250 µs is used for value document luminescent materials having a time constant of between 160 µs and 350 µs, and a reference luminescent material having a time constant of 900 µs is used for value document luminescent materials having a time constant of between 350 µs and 5 ms. Alternatively, a reference luminescent material having a time constant of 250 µs can also be used for value document luminescent materials having a time constant of between 100 µs and 5 ms. For example, for determining the sensor-specific correction factor of the respective sensor, a reference medium is used which comprises the same luminescent material as the value documents to be verified by means of the respective sensor, that is to say that the reference luminescent material and the value document luminescent material are identical.

During the velocity correction, provision is made, if the verification transport velocity vP does not correspond to the reference transport velocity v0, i.e. does not match it or does not approximately match it, for ascertaining, in particular calculating, the sensor-specific correction factor K(vP) applicable to the verification transport velocity vP on the basis of the specific sensor-specific correction factor K(v0) applicable to the reference transport velocity v0 and of the value of the reference transport velocity v0, which are stored in the sensor, or on the basis of the sensor-specific offset parameter a stored in the sensor, depending on the verification transport velocity vP. Correcting the luminescence time constant is then carried out with the aid of the calculated sensor-specific correction factor K(vP).

If the value of the reference transport velocity v0 to which the specific sensor-specific correction factor K(v0) is applicable is also stored in the sensor, the correction device can be configured to compare the verification transport velocity with the reference transport velocity and, depending on the result of the comparison, either to stipulate that the sensor-specific correction factor K(vP) applicable to the verification transport velocity (vP) is the first correction factor K(v0) applicable to the reference transport velocity v0 (if the verification transport velocity (vP) matches or at least approximately matches the reference transport velocity) or if the verification transport velocity vP does not match the reference transport velocity v0, to ascertain, in particular to calculate, the sensor-specific correction factor K(vP) applicable to the verification transport velocity vP on the basis of the specific sensor-specific correction factor K(v0) applicable to the reference transport velocity v0 and on the basis of the value of the reference transport velocity v0 and depending on the verification transport velocity vP or on the basis of the sensor-specific offset parameter a stored in the sensor.

Determination of the Sensor-Specific Correction Factor on the Basis of the Correction Assignment As correction assignment, a correction table T can be stored in the sensor, which correction table indicates for a plurality of possible offset parameters (a1, a2, . . . ) in each case the offset-dictated correction factor (K1(v0), K1(v1), K2(v0), K2(v1), . . . ) applicable to this offset parameter as a function of the transport velocity (v0, v1, . . . ) of the value document. During the velocity correction, it is then provided that in order to ascertain the sensor-specific correction factor K(vP) applicable to the verification transport velocity vP on the basis of the correction table T (and optionally on the basis of the sensor-specific offset parameter a of the sensor—if this parameter is stored in the sensor—or directly—without explicitly calculating the offset parameter a—on the basis of K(v0) and the reference transport velocity v0), the sensor-specific correction factor K(vP) is determined which is applicable to the verification transport velocity vP of the value document and the respective sensor, and correcting the luminescence time constant t(vP) is carried out with the aid of the sensor-specific correction factor K(vP) determined on the basis of the correction table T. Optionally, an additional correction can be carried out with the aid of the sensor-generally applicable correction factor K0(vP) applicable to the ideal sensor (without or with the offset predefined for the type series) and to the verification transport velocity vP.

In one development of the invention, at least two different correction assignments, e.g. correction tables T, T' or offset value assignments D, D' or correction formulae F, F', are stored in the sensor, which are applicable to different value ranges of the luminescence time constant of the value documents. The correction device has been or is then configured to select from these different correction assignments (T, T' or D, D' or F, F'), depending on information made available to the sensor regarding the target value of the luminescence time constant of the value document to be verified, that correction assignment (e.g. T or D or F) whose value range contains the target value of the luminescence time constants, and to use this correction assignment for determining the sensor-specific correction factor applicable to the verification transport velocity vP.

In one exemplary embodiment, upon delivery of the sensor, the specific sensor-specific correction factor K(v0) applicable to the reference transport velocity v0 and the reference transport velocity v0 have been stored in the sensor (but the sensor-specific offset parameter a has not already been stored). This is because the velocity correction can be carried out on the basis of the correction table T even without explicit determination of the sensor-specific offset parameter a. In order to select the sensor-specific correction factor from the correction table T, the specific sensor-specific correction factor K(v0) is then compared with those correction factors contained in the correction table which are applicable to the reference transport velocity v0 and to different offset parameters (a1, a2, . . . ). From these correction factors, moreover, that correction factor is selected which deviates the least from the specific sensor-specific correction factor K(v0). On the basis of the correction table, that sensor-specific correction factor K(vP) applicable to the verification transport velocity is then selected which lies in the same table row (i.e. is associated with the same offset parameter a) in which the specific sensor-specific correction factor K(v0) lies as well. If none of the correction factors contained in the correction table for the reference transport velocity v0 corresponds to the specific sensor-specific correction factor K(v0), the values from two table rows can also be computed with one another, e.g. interpolated, in order to calculate K(vP). Merely optionally, as an intermediate step, the sensor-specific offset parameter a of the sensor with which the correction factor K(v0) selected from the table is associated can be ascertained, and can optionally be stored in the sensor, in order to have it available more rapidly for later velocity corrections with other transport velocities. If a verification transport velocity vP for which no correction factors are entered in the correction table T is used, two correction factors from the same table row which are applicable to different transport velocities can also be computed with one another, e.g. interpolated, in order to calculate K(vP).

However, the sensor-specific correction factor K(vP) applicable to the verification transport velocity vP can also be determined by way of the sensor-specific offset parameter a which is determined on the basis of the reference transport velocity v0 and the specific sensor-specific correction factor K(v0).

If—as in the above exemplary embodiment—the specific sensor-specific correction factor K(v0) applicable to the reference transport velocity v0 and the value of the reference transport velocity v0 have been stored in the sensor (but the sensor-specific offset parameter a has not been stored), the sensor-generally applicable correction factor K0(v0) applicable to the reference transport velocity v0 can be selected from the velocity dependence of the sensor-generally applicable or ideal correction factor K0(v0), K0(v1), . . . stored in the sensor and on the basis of

- the specific sensor-specific correction factor K(v0) and the value of the reference transport velocity v0 and
- the ideal correction factor K0(v0) applicable to the reference transport velocity v0
- the sensor-specific offset parameter a of the sensor can be ascertained, in particular in step c) or during storing in step b2). By way of example, the sensor-specific offset parameter a of the sensor is calculated on the basis of the specific sensor-specific correction factor K(v0) and the value of the reference transport velocity v0 and the ideal correction factor K0(v0) applicable to the reference transport velocity with the aid of the following calculation formula:

$$a=(K(v0)-K0(v0))/(K0(v0)\cdot \arctan(v0/3)).$$

On the basis of the ascertained sensor-specific offset parameter a of the sensor, then in step c), e.g. on the basis of a correction table T or a correction function F, the sensor-specific correction factor K(vP) is determined which is applicable to the verification transport velocity vP (different than the reference transport velocity v0) of the value document.

In another exemplary embodiment, upon delivery of the sensor, the sensor-specific offset parameter a has already been stored in the sensor. For the purpose of velocity correction, the table row associated with this sensor-specific offset parameter a is selected from the correction table T, and that sensor-specific correction factor K(vP) which is applicable to the verification transport velocity of the value document is selected in this table row. If the sensor-specific offset parameter a does not exactly match one of the possible offset parameters a1, a2, . . . in the correction table, the two correction factors of the possible offset parameters (e.g. a1, a2) deviating the least from the sensor-specific offset parameter a can be computed, e.g. interpolated, in order to calculate a sensor-specific correction factor K(vP) applicable exactly to the sensor-specific offset parameter a. Alternatively, that correction factor which is applicable to the offset parameter deviating the least from the sensor-specific offset parameter a is used. If a verification transport velocity vP for which no correction factors are entered in the correction table T is used, two correction factors applicable to different transport velocities but the same offset parameter a can also be computed with one another, e.g. interpolated, in order to calculate K(vP).

If the sensor-specific offset parameter a has been stored in the sensor or—as mentioned above—was calculated from the specific sensor-specific correction factor K(v0), and the velocity dependence of the sensor-generally applicable (ideal) correction factor (K0(v0), K0(v1), . . . ) has been stored in the sensor, then a correction formula stored in the sensor can be used for calculating the sensor-specific correction factor K(vP) on the basis of the sensor-specific offset parameter a and also on the basis of the verification transport velocity vP of the value document and on the basis of the sensor-generally applicable correction factor applicable to the verification transport velocity vP of the value document. During the velocity correction, the sensor-generally applicable correction factor K0(vP) applicable to the verification transport velocity vP of the value document is selected from the velocity dependence of the sensor-generally applicable correction factor (K0(v0), K0(v1), . . . ), and on the basis of the sensor-generally applicable correction factor K0(vP) applicable to the verification transport velocity vP of the value document and on the basis of the sensor-specific offset parameter a of the sensor and the value of the verification transport velocity vP of the value document, the sensor-specific correction factor K(vP) of the sensor applicable to the verification transport velocity vP of the value document is calculated, for example by means of the following correction formula:

$$K(vP)=(K0(vP)\cdot(1+a\cdot\arctan(vP/3))).$$

If a verification transport velocity vP for which no sensor-generally applicable correction factor is stored is used, the sensor-generally applicable correction factor K0(vP) can be calculated, e.g. interpolated, from two sensor-generally applicable correction factors applicable to other transport velocities.

In some exemplary embodiments, only exactly one sensor-specific parameter has been or is stored in the sensor, and additionally the abovementioned (non-sensor-specific) correction assignment and optionally the velocity dependence of the sensor-generally applicable correction factor, but no velocity dependence of the sensor-specific correction factor has been stored in the sensor. During the velocity correction of the luminescence time constant determined for the respective value document, it is then provided that the sensor-specific correction factor K(vP) applicable to the verification transport velocity vP of the value document—for each verification transport velocity of the value document—is determined (only) on the basis of exactly this one sensor-specific parameter which was ascertained with the aid of this sensor (sensor specimen), that is to say that no further sensor-specific parameter of this sensor (i.e. sensor specimen) is used for the velocity correction. By way of example, only the specific sensor-specific correction factor K(v0) has been stored in the sensor and, during the velocity correction, no further sensor-specific correction factor K of this sensor (i.e. sensor specimen) is used which was ascertained e.g. with the aid of the same sensor specimen for some other transport velocity different than the reference transport velocity (v0) (v≠v0). Alternatively, the exactly one sensor-specific parameter can be the sensor-specific offset parameter a of the sensor or the offset length d of the sensor. Since only this one sensor-specific parameter is required for the velocity correction, the provision of the velocity correction is associated with less complexity than e.g. if a plurality of sensor-specific correction factors have to be ascertained for different verification transport velocities. This is because for the exactly one sensor-specific parameter only a single measurement of a reference medium or of the offset length is necessary in the case of each sensor specimen.

Velocity Dependence of the Sensor-Specific Correction Factor K(v)

In other exemplary embodiments, a velocity dependence of the sensor-specific correction factor K(v) is or has been stored in the respective sensor, which velocity dependence assigns to different possible (verification) transport velocities v=v0, v1, . . . of the value document in each case a sensor-specific correction factor K(v0), K(v1), K(v2), . . . applicable to the respective (verification) transport velocity. The velocity dependence of the sensor-specific correction factor K(v) can contain for example the specific sensor-specific correction factor K(v0) and the assignment thereof to the reference transport velocity v0. This velocity dependence of the sensor-specific correction factor K(v) is applicable specifically to the respective sensor, i.e. to the respective sensor specimen. The assignment can in particular correspond to a table or be a mathematical function. Since exactly the velocity dependence of the sensor-specific correction factor K(v) which is applicable specifically to this sensor, i.e. to the respective sensor specimen, is stored in the sensor, the determination of the sensor-specific correction factor applicable to the verification transport velocity in the sensor is simplified during the verification of the value documents.

In these exemplary embodiments, no (sensor-generally applicable) correction assignment (e.g. offset value assignment D, correction table T or correction formula F) need be stored in the sensor. In order to determine the velocity dependence of the sensor-specific correction factor K(v), the abovementioned correction assignment can be used, however, with the aid of the measured sensor-specific correction factor K(v0) or the offset parameter a or the offset length d, to select or to calculate the velocity dependence of the sensor-specific correction factor K(v) which is applicable to the respective sensor, e.g. by interpolation of two table rows. The velocity dependence of the sensor-specific correction factor is determined with the aid of the specific sensor. There are various possibilities for determining the velocity dependence:

In one exemplary embodiment, with the aid of the specific sensor, the luminescence time constant of a reference medium is measured at different transport velocities and—by means of the specified luminescence time constant tR0 of the reference medium—the respective sensor-specific correction factor is calculated depending on the transport velocity. The velocity dependence of the sensor-specific correction factor K(v) thus obtained can be/have been stored in the sensor as a table or formula.

For example, before delivery of the sensor on the part of the sensor manufacturer or afterward, during a calibration of the sensor in the value document processing apparatus, the abovementioned steps a1) to a4) are carried out on the same sensor (specimen) successively for a plurality of different reference transport velocities v0, v1, . . . of the reference medium. Here for each of the reference transport velocities in each case a specific sensor-specific correction factor K(v0), K(v1), . . . for the respective transport velocity v0, v1, . . . is determined on the basis of a respectively determined reference medium time constant tR(v0), tR(v1), . . . of the reference luminescent material and on the basis of the specified luminescence time constant tR0 of the reference luminescent material. From the specific sensor-specific correction factors K(v0), K(v1), . . . of the different reference transport velocities v0, v1, . . . , the velocity dependence K(v) of the sensor-specific correction factor is determined, e.g. in the form of a table or a mathematical function, by means of which in each case the sensor-specific correction factor K(v0), K(v1), . . . applicable to the respective transport velocity is assigned to different possible transport velocities v0, v1, . . . of the value document, and the velocity dependence is stored in the sensor. In the case of a table, the velocity dependence K(v) contains the specific sensor-specific correction factors K(v0), K(v1), . . . for a plurality of possible transport velocities of the value document, i.e. a plurality of sensor-specific parameters. When providing the velocity correction, the correction device for the velocity correction of the luminescence time constant t of the respective value document is configured to determine the sensor-specific correction factor K(vP) applicable to the verification transport velocity vP of the value document to be verified on the basis of the velocity dependence K(v) of the sensor-specific correction factor stored in the sensor and by means of the information made available to the sensor regarding the verification transport velocity vP of the value document. The sensor-specific correction factors K(v0), K(v1), . . . are determined in a manner specific to each sensor specimen in accordance with steps a1)-a4). The sensor-specific correction factors K(v0), K(v1), . . . contained in the velocity dependence K(v) stored in the sensor are applicable specifically to the respective sensor specimen and differ for different, nominally structurally identical sensor specimens of the same sensor type series.

In another exemplary embodiment, with the aid of the specific sensor, the offset parameter a is determined and, on the basis of the offset parameter a, with the aid of the correction assignment (correction table or correction formula), the velocity dependence of the sensor-specific correction factor K(v) is determined and stored in the sensor.

In yet another exemplary embodiment, the offset length of the specific sensor is measured and, on the basis of the offset length, the velocity dependence of the sensor-specific correction factor K(v) is determined with the aid of an offset value assignment (offset value table or a corresponding correction formula) and is stored in the sensor.

In these other exemplary embodiments, in order to determine the velocity dependence of the sensor-specific correction factor K(v), e.g. before delivery of the sensor by the sensor manufacturer, the abovementioned correction assignment (e.g. offset value assignment D, correction table T or correction formula F) is used, which, for different possible offset values of the sensor, assigns to different possible transport velocities v of the value document to be verified in each case an offset-dictated correction factor K1(v0), K1(v1), . . . , K2(v0), K2(v1), . . . , (applicable to the respective offset value d, a and the respective transport velocity v) which is possibly appropriate for the specific sensor. On the basis of the sensor-specific parameter (e.g. K(v0), a, d) and on the basis of the correction assignment (D, T, F), the velocity dependence K(v) of the sensor-specific correction factor which is applicable specifically to the respective sensor is determined and stored in the sensor, by means of which velocity dependence in each case a sensor-specific correction factor K(v0), K(v1), . . . is assigned to different transport velocities v0, v1, . . . . By means of the information made available to the sensor regarding the verification transport velocity vP and on the basis of the velocity dependence of the sensor-specific correction factor K(v) stored in the sensor, the correction device of the sensor then determines the sensor-specific correction factor K(vP) applicable to the verification transport velocity vP of the value document.

In particular, the correction device, for correcting the luminescence time constant t of the value document to be verified, can be configured to compare the verification transport velocity vP of the value document with those transport velocities v0, v1, . . . for which sensor-specific correction factors K(v0), K(v1), . . . are stored in the sensor, in particular in the velocity dependence K(v) of the sensor-specific correction factors stored in the sensor. From these transport velocities, the correction device can then select that transport velocity (e.g. v1) which corresponds to (is equal to or deviates the least from) the verification transport velocity vP of the value document, and can use the correction factor K(v1) applicable to the selected transport velocity (e.g. v1) as a sensor-specific correction factor in order to determine the corrected luminescence time constant t*(vP) for the value document. The correction device can calculate, e.g. interpolate, the sensor-specific correction factor K(vP) applicable to the verification transport velocity vP also on the basis of at least two of the sensor-specific correction factors K(v0), K(v1), . . . stored in the sensor, the respectively assigned transport velocity v0, v1 of which deviates the least from the verification transport velocity vP.

In one development of the invention, the correction device has been/is configured to determine the sensor-specific correction factor applicable to the verification transport velocity depending on information regarding the transport direction of the value document to be verified relative to the sensor, along which transport direction the value document to be verified is transported past the sensor.

By way of example, at least one correction assignment, in particular offset value assignment D or correction table T or correction formula F, can be/have been stored in the sensor, which correction assignment indicates the offset-dictated correction factors for two mutually opposite transport directions of the value document to be verified relative to the sensor. The offset-dictated correction factors for the two mutually opposite transport directions of the value document to be verified can be contained in exactly one correction assignment stored in the sensor (transport directions distinguishable by positive and negative signs of the transport velocities) or in two different correction assignments which are stored in the sensor and which are applicable to the two different transport directions of the value document relative to the sensor. The correction device can be/have been configured, on the basis of the at least one correction assignment, by means of the information made available to the sensor regarding the verification transport velocity and by means of the sensor-specific parameter (e.g. K(v0), a, d) stored in the sensor and depending on information made available to the sensor regarding the verification transport direction of the value document to be verified, to select that sensor-specific correction factor which is applicable to the verification transport velocity of the value document in this transport direction, and to use it for correcting the measured luminescence time constant.

Alternatively, for the same reference medium, at least one velocity dependence of the sensor-specific correction factor for mutually opposite transport directions of the value document relative to the sensor can be or have been determined and stored in the sensor. For this purpose, exactly one velocity dependence of the sensor-specific correction factor can be stored in the sensor (transport directions distinguishable by positive and negative signs of the transport velocities) or two different velocity dependences of the sensor-specific correction factor can be stored in the sensor, which are applicable to the two different transport directions of the value document relative to the sensor. The correction device can be/have been configured, depending on information made available to the sensor regarding the verification transport direction of the value document to be verified relative to the sensor, to select that one of the two velocity dependences of the sensor-specific correction factor which is applicable to the verification transport direction of the value document to be verified, and to determine the sensor-specific correction factor for the value document to be verified on the basis of the selected velocity dependence of the sensor-specific correction factor by means of the information made available to the sensor regarding the verification transport velocity and to use it for correcting the measured luminescence time constant.

In another development of the invention, the correction device has been/is configured to determine the sensor-specific correction factor applicable to the verification transport velocity depending on information made available to the sensor regarding a target value of the luminescence time constant of the value document to be verified.

By way of example, at least two correction assignments, in particular offset value assignments D, D' or correction tables T, T' or correction formulae F, F', can be/have been stored in the sensor, which correction assignments indicate the offset-dictated correction factors for different value ranges of the luminescence time constant of the value document to be verified. The correction device has been/is configured to select from these different correction assignments (D, D' or T, T' or F, F'), depending on information made available to the sensor regarding a target value of the luminescence time constant of the value document to be verified, that correction assignment (D or D' or T or T' or F or F') whose value range contains the target value, and to use this correction assignment for determining the sensor-specific correction factor K(vP) applicable to the verification transport velocity vP. The correction device can be/have been configured, on the basis of this selected correction assignment by means of the information made available to the sensor regarding the verification transport velocity and by means of the sensor-specific parameter (e.g. K(v0), a, d) stored in the sensor, to select that sensor-specific correction factor which is applicable to the verification transport velocity of the value document to which this target value of the luminescence time constant is assigned, and to use it for correcting the measured luminescence time constant.

Alternatively, at least two velocity dependences K(v), K'(v) of the sensor-specific correction factor can be/have been determined and stored in the sensor, to which different value ranges of luminescence time constants of value documents to be verified are assigned or which are applicable to different value ranges of luminescence time constants of value documents to be verified. The correction device then is/has been configured to select from these velocity dependences K(v), K'(v), depending on information made available to the sensor regarding a target value of the luminescence time constant of the value document to be verified, that velocity dependence (K(v) or K'(v)) of the sensor-specific correction factor whose value range contains this target value, and to use it for determining the sensor-specific correction factor applicable to the verification transport velocity. The velocity dependences K(v), K'(v) applicable to different value ranges of luminescence time constants can be determined e.g. on the basis of a plurality of reference media whose specified luminescence time constant tR0 lies in the respective value range, in particular by measurement of the reference medium time constants of the different reference media in each case as a function of the transport velocity.

The invention also relates to an apparatus for processing value documents, which comprises the sensor described above. The apparatus comprises a transport device configured for transporting the value document to be verified in each case past the sensor along a transport direction at a verification transport velocity. For example, the apparatus is a sorting apparatus for value documents.

The apparatus can comprise a device which is configured for determining the information regarding the verification transport velocity of the value document and whose information regarding the verification transport velocity is communicated to the sensor and thus made available to the latter. This device can be the control device of the apparatus, which has the information regarding the verification transport velocity of the value documents that is set at the apparatus. However, the device can also be a velocity sensor for measuring the verification transport velocity of the value document and/or use one or more light barriers for this purpose. Alternatively, the device can also be the operator interface of the apparatus, at which the verification transport velocity of the value documents can be set by an operator of the apparatus. Alternatively, the verification transport velocity can also be ascertained and thus made available by the sensor itself, e.g. by means of the photodetector and optionally an additional photodetector positioned at a known distance therefrom in the sensor, which detect the temporal interval of one of the value document edges transported past.

The invention also relates to a method for verifying value documents by means of the sensor according to the invention, past which sensor the value documents are transported along a transport direction at a verification transport velocity vP for the verification of said value documents, comprising the following steps:

A) transporting a value document past the sensor at the verification transport velocity vP and measuring the change over time in the luminescence of the value document by means of the sensor while said value document is transported past, B) making available information regarding the verification transport velocity vP of the value document in the sensor, e.g. determining, optionally communicating and storing the information in a memory area of the sensor, C) determining a sensor-specific correction factor K(vP) which is applicable to the verification transport velocity vP of the value document on the basis of the sensor-specific parameter stored in the sensor and by means of the information made available to the sensor regarding the verification transport velocity vP, D) determining a luminescence time constant t(vP) of the value document at the verification transport velocity vP on the basis of the measured change over time in the luminescence of the value document, E) correcting the luminescence time constant t(vP) of the value document with the aid of the sensor-specific correction factor K(vP) applicable to the verification transport velocity vP of the value document in order to determine a corrected luminescence time constant t*(vP) for the value document, F) verifying the value document on the basis of the corrected luminescence time constant t*(vP), in particular by comparing t*(vP) with reference value(s) or threshold(s) expected for the value document, e.g. for an authenticity verification of the value document.

The value documents to be verified are e.g. banknotes, checks, identity cards, credit cards, check cards, tickets, vouchers, etc.

BRIEF DESCRIPTION OF THE DRAWINGS

The invention is explained below by way of example with reference to the following figures, in which.

DETAILED DESCRIPTION OF VARIOUS EMBODIMENTS

The decay time of the luminescence is used hereinafter as an example of the luminescence time constant. However, the invention equally relates to other luminescence time constants, such as e.g. the luminescence build-up time or others.

Figure 1:
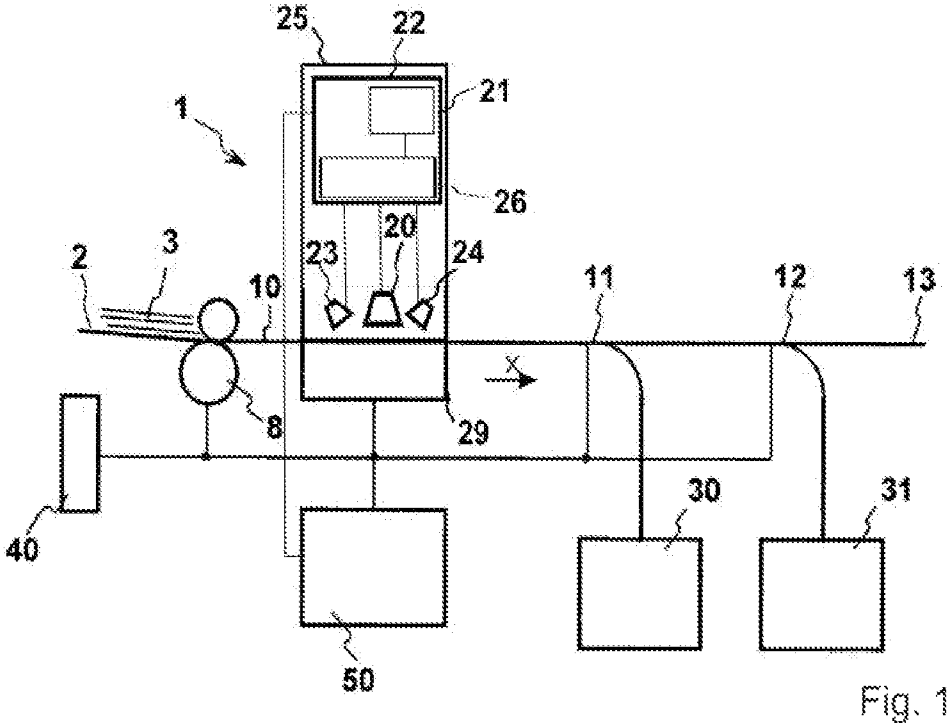
FIG. 1 shows a schematic set-up of a value document processing apparatus comprising the sensor.

FIG. 1 shows by way of example the schematic set-up of a value document processing apparatus 1 comprising an introduction compartment 2, in which a stack of value documents 3 to be processed is provided, and a separator 8, which successively detects in each case one (e.g. the respective bottommost or topmost) value document of the introduced stack and transfers it to a—merely schematically represented in the illustration chosen—transport device 10 (transport belts and/or transport rollers), which transports the value documents past a sensor 25 in the transport direction x.

In the example illustrated, the sensor 25 comprises a photodetector 20 comprising at least one photosensitive element which converts the luminescence intensities emitted by the value document transported past into corresponding sensor signals. The photodetector 20 can also comprise a plurality of such photosensitive elements, e.g. for different spectral components of the luminescence light. The sensor 25 can also be designed for verifying the value documents 3 in one or more measurement tracks on the respective value document, wherein a respective photodetector 20 having one or more photosensitive elements is present for each of the measurement tracks. The optical excitation of the value documents is effected e.g. by means of excitation light sources 23, 24 arranged on both sides of the photodetector 20, which illuminate the value document with excitation light in an illumination region 6, cf. FIG. 3. The sensor 25 is arranged on the left-hand side of the transport path—as viewed in the transport direction x of the value documents. Another sensor 29 can be arranged opposite the sensor 25, on the right-hand side of the transport path. The photodetector 20 is designed for the temporally resolved measurement of the luminescence of the value documents during or after the end of the optical excitation. For this purpose, the photodetector 20 is controlled by a control device of the sensor (not shown) in such a way that it detects the luminescence of the detection region 9 (cf. FIG. 3) at a plurality of detection times t, (i=1, . . . , n).

The sensor signals detected from the measurement location to be verified of the value documents are forwarded to an evaluation device 22 of the sensor by the photodetector. The evaluation device 22 can be contained in the housing of the sensor 25 or outside that, e.g. in a central evaluation device of the value document processing apparatus 1. The evaluation device 22 determines the luminescence time constant t(vP) on the basis of the sensor signals detected at the different detection times. One or more sensor-specific parameter(s)—depending on the exemplary embodiment either the sensor-specific correction factor K(v0) or the offset parameter a or the offset length d or the velocity dependence of the sensor-specific correction factor K(v)—are stored in a memory area 26 of the evaluation device 22. A correction device 21 of the evaluation device 22 can access the information stored in the memory area 26 in order to use it for the velocity correction of the luminescence time constant.

Further information can be stored in the memory area 26, such as e.g. information regarding the verification transport velocity vP of the value documents, which can be different depending on the type or setting of the value document processing apparatus 1. Moreover, one or more tables and/or one or more mathematical functions can also be stored in the memory area 26, which are used during the velocity correction of the luminescence time constant, cf. the following exemplary embodiments.

From the intensity values of the value documents measured by the photodetector 20 at the detection times t, (i=1, . . . , n), the evaluation device determines the luminescence time constant t(vP) of a security feature of the value documents and transfers it to the correction device 21, which carries out the velocity correction according to the invention on the basis of the sensor-specific parameter(s) stored in the memory area 26 and by means of the information regarding the verification transport velocity vP of the value documents. The luminescence time constant t*(vP) corrected by the correction device 21 is then used by the evaluation device 22 as a verification criterion for the value documents, in particular for assessing the authenticity of the value documents.

Depending on the authenticity of the respective value document ascertained by the evaluation device 22, the diverters 11 and 12 along the transport path are controlled by the control device 50 in such a way that the value document is transported into one of the dispensing compartments 30, 31 of the value document processing apparatus 1. By way of example, value documents which were recognized as authentic are placed in a first dispensing compartment 30, while value documents categorized as inauthentic or suspected counterfeit are placed in a second dispensing compartment 31. At the end of the illustrated transport path (reference numeral 13), further dispensing compartments and/or other devices can be provided, for example for storing or for destroying value documents, such as e.g. cassettes for protected storage of the value documents or a shredder. If a value document was not able to be recognized, for example, then for such a value document a special dispensing compartment can be provided, into which value documents of this type are placed and provided for a separate treatment, for example by an operator.

In the example illustrated, the value document processing apparatus 1 furthermore comprises an input/output device 40 for the input of data and/or control commands by an operator, for example by means of a keyboard or a touchscreen, and for the output or display of data and/or information concerning the processing process, in particular concerning the value documents processed in each case.

Figure 2A:
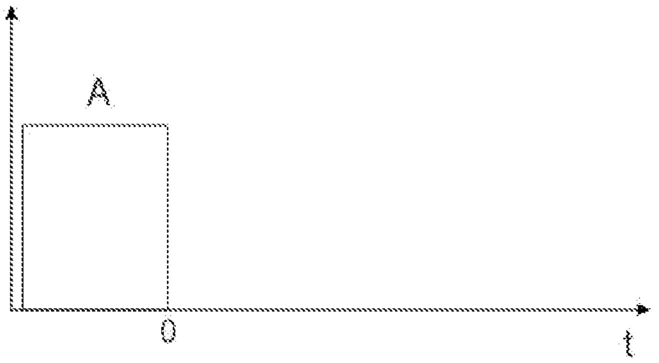
FIG. 2*a* shows an excitation pulse of the luminescence excitation.
Figure 2B:
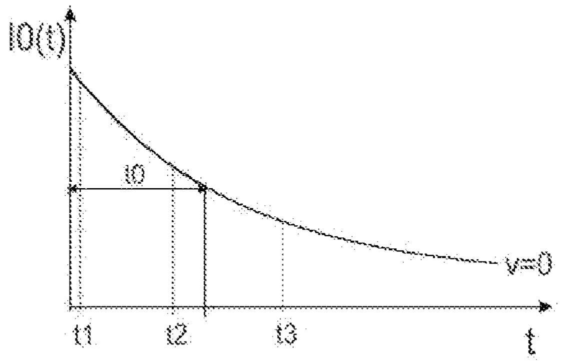
FIG. 2*b* shows a temporal profile of the luminescence intensity emitted by a value document in the case of a static verification (v=0)
Figure 2C:
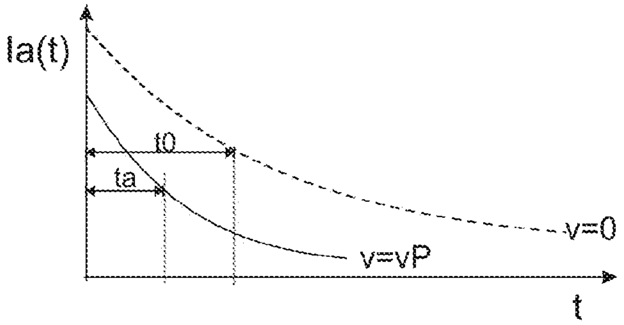
FIGS. 2*c*-*d* show a temporal profile of the luminescence intensity of the value document at a transport velocity v=vP for a first sensor specimen (FIG. 2*c*) and for a second sensor specimen (FIG. 2*d*), different therefrom, of the same sensor type series.

FIGS. 2*a-c* show the temporal behavior of the luminescence of a value document that is emitted by a luminescent security feature of the value document. FIG. 2*a* shows the intensity profile of the optical excitation pulse A, which is directed at the value document for luminescence excitation and ends at the time t=0. FIG. 2*b* illustrates the intensity profile I0(t) detected during a static measurement as a function of the time after the end (t=0) of the excitation pulse A, i.e. when the value document is not moved relative to the detector (v=0). Such a static measurement is carried out e.g. during a manual verification of individual value documents. In the example considered, the luminescence is detected at three detection times t1, t2, t3, cf. FIG. 2*b*. During the static measurement, the detected luminescence intensity of the security feature decays with the specified luminescence time constant t0 of the security feature, e.g. where t0=250 μs. During the static measurement, different sensor specimens 25*a*, 25*b* of the same sensor type series yield the same measurement result of the luminescence time constant.

If, during the mechanical verification in a value document processing apparatus, the same value document is transported at a transport velocity of e.g. vP=8 m/s past a first sensor specimen 25*a* of a particular sensor type series, the photodetector 20 of said sensor specimen detects the intensity profile Ia(t)—illustrated in FIG. 2*c*—as a function of the time after the end (t=0) of the excitation pulse A emitted by the excitation light sources 23, 24. For comparison purposes, the intensity profile I0(t) detected in the static case with the decay time t0 is also illustrated in a dashed manner in FIG. 2*c*. The decay time ta resulting from the intensity profile Ia(t) is ta=147 μs and is thus distinctly shorter than the decay time t0=250 μs of the static measurement.

The relative movement of the value document relative to the sensor 25 has the effect that a shorter decay time ta is determined than in the static case. This results from the fact that during the detection the value documents continue to be moved by a certain length which is comparable with the size of the detection region and illumination region. The position of the illumination region on the value document thus changes during the measurement, and the measured intensity profile at the detector corresponds to a convolution from the temporal behavior of the luminescent material and the movement-dictated change in the overlap between the illumination region and the detection region on the value document.

Figure 2D:
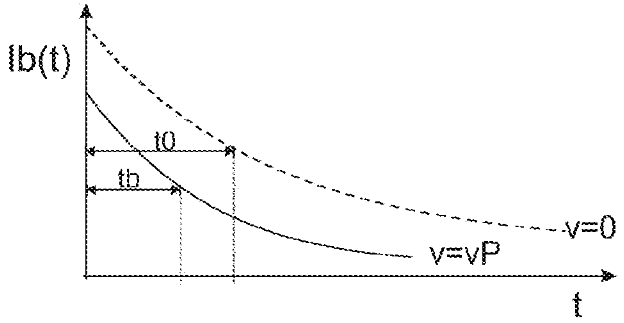

FIG. 2*d* illustrates the corresponding intensity profile Ib(t) of the same value document when the latter, during the mechanical verification of the value documents in the value document processing apparatus 1, is transported at the same verification transport velocity of e.g. vP=8 m/s past a second sensor specimen 25*b*, which belongs to the same sensor type series as the sensor specimen 25*a*, i.e. is nominally structurally identical thereto. The decay time tb resulting from the intensity profile Ib(t) of the second sensor specimen 25*b* is tb=179 μs and thus lies between the decay time ta of the sensor specimen 25*a* of 147 μs and the decay time t0=250 μs of the static measurement. Despite the sensor specimens 25*a* and 25*b* being nominally structurally identical, very different decay times ta, tb are thus determined from the same value document at a verification velocity vP≠0.

It is assumed that these differences in the decay times ta, tb, or generally of the luminescence time constants, crucially result from geometric inaccuracies of the position and/or the angle of the optical excitation and of the photodetector, and also the installation position of the sensor in the value document processing apparatus. Since these inaccuracies vary from one sensor specimen to another, a sensor-specific correction of the measured luminescence time constant is carried out according to the invention.

In order to take account of the sensor-specific differences, one or more sensor-specific parameter(s) applicable specifically to the respective sensor specimen are used for the velocity correction of the luminescence time constant. The determination of the sensor-specific parameter(s) is carried out e.g. before the delivery of the sensor by the sensor manufacturer or after delivery of the sensor to the customer during a sensor calibration which is occasionally carried out and in which the sensor can be installed in the value document processing apparatus or else in a sensor measuring station provided specially for this purpose. During calibration, the respective sensor can e.g. also be adjusted with regard to the detected intensity.

1st Exemplary Embodiment

In the first exemplary embodiment, a single, specific sensor-specific correction factor K(v0) ascertained by means of a reference medium transported past the sensor is used as a sensor-specific parameter. The reference medium is provided with a reference luminescent material and is in sheet form, for example. The ascertainment of the specific sensor-specific correction factor K(v0) is carried out by the sensor manufacturer or—after the delivery of the sensor—during the calibration of the sensor installed in the value document processing apparatus.

As an example, a reference medium is considered whose reference luminescent material has a specified luminescence time constant, in particular decay time, of tR0=250 appropriately matching the value document to be verified. In order to determine the sensor-specific correction factor K(v0), the reference medium is transported past the respective sensor specimen once at a reference transport velocity v0. For this reference transport velocity v0, a temporally resolved measurement of the luminescence emitted by the reference luminescent material is detected by the photodetector 20 of the sensor. The measured change over time in the luminescence of the reference medium is used to determine a reference medium time constant tR(v0) of the reference luminescent material for the reference transport velocity v0. On the basis of the determined reference medium time constant tR(v0) and on the basis of the specified luminescence time constant tR0 of the reference luminescent material, a specific sensor-specific correction factor K(v0) for the reference transport velocity v0 is determined. By way of example, this is done by forming the relationship K(v0)=tR0/tR(v0) between the reference medium time constant tR(v0) determined for the reference transport velocity v0 and the specified luminescence time constant of the reference luminescent material tR0. The specific sensor-specific correction factor K(v0) which was determined in a manner specific to the respective sensor is stored in the memory area 26 of the evaluation device 22 and assigned there to the reference transport velocity v0, the value of which is likewise stored in the memory area 26.

For the sensor specimen 25*a*, a decay time tR(v0)=147 μs was determined with this reference medium at the reference transport velocity v0=8 m/s. A value of K(v0)=1.70 thus results as a specific sensor-specific correction factor K(v0), which value is stored in a manner linked with the reference transport velocity v0=8 m/s in the memory area 26 of the sensor specimen 25*a*.

For the sensor specimen 25*b*, by contrast, a decay time tR(v0)=179 μs was determined with the same reference medium at the reference transport velocity v0=8 m/s. A value of K(v0)=1.40 thus results as a specific sensor-specific correction factor K(v0), which value is stored in a manner linked with the reference transport velocity v0=8 m/s in the memory area 26 of the sensor specimen 25*b*.

In addition to the specific sensor-specific correction factor K(v0), a sensor-generally applicable correction assignment, e.g. a correction table T or a correction formula F, is stored in the memory area 26 of the respective sensor.

1st Exemplary Embodiment—First Variant

In a first variant of the first exemplary embodiment—before delivery of the sensors—a correction table T usable for all the sensor specimens of this sensor type series is created for the velocity correction of the luminescence time constants, which correction table is then stored in the memory area 26 of the respective sensor 25 together with the specific sensor-specific correction factor K(v0).

In order to determine the values contained in the correction table T, an ideal reference sensor 25R4 is used, for example, which is known to have no offset between its illumination region and its detection region. The reference medium mentioned above is transported past the reference sensor 25R4 at different transport velocities v and a temporally resolved measurement of the luminescence emitted by the reference luminescent material is detected by the photodetector 20 of the reference sensor. The measured change over time in the luminescence of the reference medium is used to determine in each case the reference medium time constant tR(v) of the reference luminescent material for the respective transport velocity v. On the basis of the reference medium time constant tR(v) of the reference luminescent material and on the basis of the specified luminescence time constant tR0=250 μs of the reference luminescent material, the relationship tR0/tR(v) is formed in each case. This yields the velocity dependence of an ideal correction factor K0(v) as indicated in table 1. The correction factors indicated therein are applicable to a sensor of this sensor type series which has no spatial offset between its illumination region and its detection region.

TABLE 1

Correction factors for the ideal reference sensor 25R4

| Velocity v [m/s] | 0 | 2 | 3 | 4 | 5 | 6 | 7 | 8 | 9 | 10 |
|---|---|---|---|---|---|---|---|---|---|---|
| Decay time tR(v) [μs] | 250 | 225 | 212 | 200 | 185 | 172 | 160 | 149 | 138 | 128 |
| Correction factor K0(v) | 1 | 1.11 | 1.18 | 1.25 | 1.35 | 1.45 | 1.56 | 1.68 | 1.81 | 1.96 |

In the case of a sensor type series which has a predefined offset between the illumination region and the detection region of the sensors owing to the dictates of design, a reference sensor is used in which the offset corresponds exactly to the predefined offset, and a correction table is thus created whose correction factors are applicable to a sensor (which is ideal for the sensor type series) whose offset between illumination region and detection region corresponds exactly to the predefined offset.

In order to determine the correction table T mentioned above, before delivery of the sensor, a corresponding velocity dependence of the correction factor K(v)=t0/tR(v) can additionally be ascertained for different further reference sensors 25R1, 25R2, . . . of the sensor type series of the sensor 25, which actually have an offset (or an offset deviating from the predefined offset) between illumination region and detection region, said offset being of different magnitudes. Table 2 shows the correction table T ascertained in this way, which indicates the offset-dictated correction factors K1(v0), K1(v1), K2(v0), K2(v1), . . . for seven different reference sensors. The correction table T thus ascertained by the sensor manufacturer is applicable to all sensor specimens of the sensor type series of the sensor 25 and is stored in the memory area of the individual sensor specimens 25*a*, 25*b*.

which the ideal correction factors K0(v) (applicable to an offset-free sensor) are worked out. The purely offset-dictated correction factors Bi(v) result from the correction factors Ki(v) contained in table 2 in each case by way of division: Bi(v)=Ki(v)/K0(v). In the sensor, a correction table with the purely offset-dictated correction factors Bi(v) for different reference sensors is then stored, and additionally the velocity dependence of the ideal correction factor K0(v), cf. table 1.

The sensor specimens 25*a*, 25*b* with the specific sensor-specific correction factor K(v0) respectively stored therein and the correction table T stored therein are then delivered to the customer by the sensor manufacturer, and the customer uses the respective sensor e.g. in a value document processing apparatus.

During the verification of the value documents by the respective sensor specimen 25*a*, 25*b*, in which the respective specific sensor-specific correction factor K(v0) is stored, the sensor-specific correction factor K(vP) applicable to the verification transport velocity vP is determined on the basis of the correction table T stored in the sensor specimen 25*a*, 25*b*. For this purpose, firstly the specific sensor-specific correction factor K(v0) (in the case of sensor specimen 25*a*: K(v0)=1.70; in the case of sensor specimen 25*b*: K(v0)=1.40) is compared with those correction factors

TABLE 2

Correction table T with offset-dictated correction factors K1(v), . . . , K7(v) for sensors of the sensor type series of the sensor 25 with different offsets

| Velocity v [m/s] | 0 | 2 | 3 | 4 | 5 | 6 | 7 | 8 | 9 | 10 |
|---|---|---|---|---|---|---|---|---|---|---|
| Reference sensor 25R1 (a =− 0.15) | 1.00 | 1.01 | 1.04 | 1.08 | 1.14 | 1.21 | 1.29 | 1.37 | 1.47 | 1.58 |
| Reference sensor 25R2 (a =− 0.1) | 1.00 | 1.04 | 1.09 | 1.13 | 1.21 | 1.29 | 1.38 | 1.48 | 1.58 | 1.71 |
| Reference sensor 25R3 (a = −0.05) | 1.00 | 1.08 | 1.13 | 1.19 | 1.28 | 1.37 | 1.47 | 1.58 | 1.70 | 1.83 |
| Reference sensor 25R4 (a = 0, ideal) | 1.00 | 1.11 | 1.18 | 1.25 | 1.35 | 1.45 | 1.56 | 1.68 | 1.81 | 1.96 |
| Reference sensor 25R5 (a = 0.05) | 1.00 | 1.14 | 1.23 | 1.31 | 1.42 | 1.53 | 1.65 | 1.78 | 1.92 | 2.09 |
| Reference sensor 25R6 (a = 0.1) | 1.00 | 1.18 | 1.27 | 1.37 | 1.49 | 1.61 | 1.74 | 1.88 | 2.04 | 2.21 |
| Reference sensor 25R7 (a = 0.15) | 1.00 | 1.21 | 1.32 | 1.42 | 1.56 | 1.69 | 1.83 | 1.99 | 2.15 | 2.34 |

As an alternative to the measurement of the luminescence time constant tR(v) of a reference medium by means of different reference sensors at different transport velocities v of the reference medium, the correction table T can also be determined by means of a mathematical simulation of the detection process of the sensor, in which the temporal profile of the luminescence intensity of the luminescent material is taken as a basis and from that the movement-dictated change over time in the overlap between the illumination region and the detection region on the value document is calculated.

As an alternative to the correction factors Ki(v), however, the correction table can also contain just the purely offset-dictated portion Bi(v) of these correction factors, from which are contained in the correction table T and which are applicable to the reference transport velocity (v0=8 m/s). From these, that reference sensor is selected whose correction factor for the reference transport velocity v0 corresponds to, or deviates the least from, the specific sensor-specific correction factor K(v0) of the respective sensor specimen. From this it transpires that the sensor specimen 25*a* approximately corresponds to the reference sensor 25R4 (K0(v0)=K4(v0)=1.68) and the sensor specimen 25*b* approximately corresponds to the reference sensor 25R1 (K1(v0)=1.37). On the basis of the correction table T, that sensor-specific correction factor Ki(vP) of the respectively corresponding reference sensor which is applicable to the verification transport velocity (vP, e.g. 10 m/s) is then selected, i.e. K4(vP)=1.96 in the case of the sensor specimen 25*a* and K1(vP)=1.58 in the case of the sensor specimen 25*b*. These correction factors can be used as a sensor-specific correction factor K(vP) of the respective sensor specimen in the case of vP=10 m/s.

If—as here—the specific sensor-specific correction factor K(v0) does not exactly match one of the correction factors of a reference sensor that are applicable to the reference transport velocity in the correction table T, alternatively during the determination of the sensor-specific correction factor K(vP) it is also possible to use the correction factors from the two reference sensors whose correction factors Ki(v0), Kj(v0) for the reference transport velocity v0 deviate the least from the specific sensor-specific correction factor K(v0). These are for example the reference sensors 25R4 and 25R5 in the case of sensor specimen 25*a*, and the reference sensors 25R1 and 25R2 in the case of sensor specimen 25*b*. During the determination of the sensor-specific correction factor for the verification transport velocity vP, the two correction factors of these two reference sensors that are associated with the transport velocity vP are interpolated in order to determine the sensor-specific correction factor K(vP) more accurately. For the sensor specimen 25*a*, the correction factors of the reference sensors 25R4 and 25R5 for vP=10 m/s are interpolated, which yields K(vP)=1.99. For the sensor specimen 25*b*, the correction factors of the reference sensors 25R1 and 25R2 for vP=10 m/s are interpolated, which yields K(vP)=1.61.

If the verification transport velocity vP does not exactly match one of the transport velocities v contained in the correction table, it is possible to interpolate the corresponding correction factors of the two transport velocities v closest to the verification transport velocity vP from the correction table T.

With the aid of the sensor-specific correction factor K(vP) which was determined on the basis of the correction table T, the respective sensor specimen 25*a*, 25*b* can carry out the velocity correction of the luminescence time constant t(vP) measured at the value document to be verified. The corrected luminescence time constant t*(vP) arises e.g. by way of multiplication t*(vP)=t(vP)·K(vP).

The luminescence time constant of the value document measured at the verification transport velocity vP=10 m/s in the sensor 25*a* is approximately ta(vP)=128 Multiplication by the sensor-specific correction factor K(vP)=1.99 of the sensor specimen 25*a* yields from this a corrected luminescence time constant of ta*(vP)=255 μs for the verified value document. In the case of the second sensor specimen 25*b*, with the luminescence time constant tb=158 measured at vP=10 m/s, multiplication by the sensor-specific correction factor K(vP)=1.61 of the sensor specimen 25*b* yields a corrected luminescence time constant of tb*(vP)=254 μs for the same verified value document. Both corrected luminescence time constants thus approximately match the decay time of the value document t0=250 μs determined during the static measurement. In order to verify the value document, this corrected luminescence time constant ta* and tb*, respectively, is compared e.g. with a target value (here t0=250 μs) and, in the case of a deviation from the target value which is greater than an acceptance range, the value document is segregated as suspected counterfeit by the value document processing apparatus 1.

In contrast to the sensor-specific correction according to the invention, in the case of a sensor-independent correction of the measured time constant only with the sensor-generally applicable correction factor K0(vP)=1.96 (see table 1), a distinctly different luminescence time constant would possibly be obtained, thus e.g. a corrected time constant tb*'=tb(vP)K0(vP)=310 μs in the case of the sensor 25*b*. In order for the value document here still to be recognized as authentic, a significantly larger acceptance range around the specified 250 μs would have to be chosen, thereby making it distinctly easier to counterfeit the security feature.

1st Exemplary Embodiment—Second Variant

In a second variant of the first exemplary embodiment, in the individual sensors 25*a*, 25*b* of the sensor type series, in addition to the specific sensor-specific correction factor K(v0)—instead of the correction table T—a mathematical correction formula F is stored, specifying a set of possible velocity dependences of the correction factor K(vP) for different offset parameters a. The correction formula F can be determined by the sensor manufacturer e.g. on the basis of the correction table T (for instance by fitting a fit function to the table values) or by means of mathematical simulation. For the sensor type series of the sensor 25, this yields e.g. the correction formula $$K(vP)=(K0(vP)\cdot(1+a\cdot\text{arc tan}(vP/3)) \quad \text{(F)},$$

specifying the velocity dependence of the correction factor K(vP) depending on the offset parameter a and depending on the verification transport velocity vP of the value document. The offset parameters a applicable to the reference sensors 25R1-25R7 are concomitantly indicated in the first column of table 2. Other correction formulas generally arise for other sensor type series.

Moreover, the velocity dependence of the correction factors K0(v) applicable to the ideal, offset-free reference sensor 25R4 is stored in the sensor (cf. table 1). From the velocity dependence of the ideal correction factor K0(v), that ideal correction factor (K0(v0)=1.68) is selected which is applicable to the reference transport velocity (v0=8 m/s). On the basis of the specific sensor-specific correction factor K(v0) stored in the sensor and the reference transport velocity v0 linked therewith and by means of the ideal correction factor K0(v0) for the reference transport velocity v0, the sensor can calculate the sensor-specific offset parameter a of the sensor with the aid of the following formula derived from (F):

$$a=(K(v0)-K0(v0))/(K0(v0)\cdot\text{arc tan}(v0/3)) \quad \text{(F*)}$$

With formula F* this yields a sensor-specific offset parameter of approximately a=+0.01 for the sensor specimen 25*a* and a sensor-specific offset parameter of approximately a=−0.14 for the sensor specimen 25*b*. The calculation of a by means of formula F* can be effected by the sensor manufacturer or after delivery of the sensor. Preferably—in addition to K(v0)—the sensor-specific offset parameter a is also stored in the memory area 26 of the respective sensor specimen 25*a*, 25*b* in order to have it available possibly for later velocity corrections with other verification transport velocities vP.

After delivery of the sensor, before the value document verification in a value document processing apparatus, the sensor-specific correction factor K(vP) applicable to the verification transport velocity is calculated on the basis of the correction formula F. For this purpose, from the velocity dependence of the ideal correction factor K0(v), the ideal correction factor (K0(vP)=1.96) applicable to the verification transport velocity (e.g. vP=10 m/s) of the value document is selected. From that, with the aid of the correction formula F, the sensor-specific correction factor K(vP) of the sensor is calculated which is applicable to the ascertained sensor-specific offset parameter a of the sensor and the verification transport velocity vP of the value document. In this way, K(vP)=1.99 is obtained in the case of the sensor specimen 25*a*, and K(vP)=1.61 in the case of the sensor specimen 25*b*. With the aid of the sensor-specific correction factor K(vP) determined on the basis of the correction formula F, the respective sensor specimen 25*a*, 25*b* can carry out the velocity correction of the luminescence time constant t(vP) measured at the value document to be verified: t*(vP)=t(vP)·K(vP).

2nd Exemplary Embodiment

In the second exemplary embodiment—instead of the specific sensor-specific correction factor K(v0)—the above-mentioned sensor-specific offset parameter a is used as a sensor-specific parameter and, before delivery of the sensor, is stored in the memory area 26 of the sensor 25, together with a sensor-generally applicable correction assignment, e.g. the correction table T or the correction formula F.

The sensor-specific offset parameter a of the sensor can be calculated—as described in the first exemplary embodiment—with the aid of the formula F* from the specific sensor-specific correction factor K(v0) which—as in the first exemplary embodiment—is determined by measurement of the luminescence time constant of the reference medium transported past the sensor at the reference transport velocity v0. As a sensor-specific offset parameter, the value a=+0.01 is stored in the sensor specimen 25*a*, and the value a=−0.14 in the sensor specimen 25*b*.

In addition to the sensor-specific offset parameter a, either the correction table T described in the first exemplary embodiment is also stored in the sensor specimens 25*a,b*, which correction table indicates the offset-dictated correction factors Ki(v) for sensors of the sensor type series of the sensor 25 depending on the offset parameter a and depending on the transport velocity v of the value document. As an alternative to the correction table T, the correction formula F can also be stored—in addition to the sensor-specific offset parameter a—in the sensor specimens 25*a,b*, which correction formula indicates the velocity dependence of the correction factor K(v) depending on the sensor-specific offset parameter a and depending on the transport velocity v of the value document for sensors of this sensor type series. The sensor with the sensor-specific offset parameter a stored therein and the correction table T or correction formula F stored therein is then delivered to the customer by the sensor manufacturer, and the customer uses this sensor to carry out the value document verification using a value document processing apparatus.

The verification transport velocity vP of the value document is required for ascertaining the sensor-specific correction factor K(vP) applicable to the verification transport velocity vP. This verification transport velocity can be communicated to the sensor by the value document processing apparatus, and can optionally be stored in the sensor. The verification of the value documents by means of the sensor then proceeds as follows:

If the correction table T is stored in the sensor 25, the correction device 21 of the sensor, on the basis of the sensor-specific offset parameter a of the sensor and on the basis of the correction table T, then determines the sensor-specific correction factor K(vP) which is applicable to the verification transport velocity vP of the value document and the sensor-specific offset parameter a of the sensor. If the sensor-specific offset parameter a of the respective sensor does not exactly match one of the possible offset parameters of the correction table T, it is possible to interpolate the two correction factors of the possible offset parameters deviating the least from the sensor-specific offset parameter a from the correction table T. Moreover if the verification transport velocity vP does not exactly match one of the transport velocities v contained in the correction table, it is possible to interpolate the corresponding correction factors of the two transport velocities v closest to the verification transport velocity vP from the correction table T. In this regard, the sensor-specific correction factor K(vP) applicable to the sensor-specific offset parameter a of the sensor and to the verification transport velocity vP of the value document can be calculated accurately.

If the correction formula F is stored in the sensor 25, the velocity dependence of the correction factors K0(v) applicable to the ideal reference sensor 25R4 is preferably also stored in the sensor (cf. table 1). From this velocity dependence, that ideal correction factor K0(vP) which is applicable to the verification transport velocity vP of the value document is selected. From that, the correction device 21 of the sensor, with the aid of the correction formula F, on the basis of the sensor-specific offset parameter a of the sensor, calculates the sensor-specific correction factor K(vP) which is applicable to the verification transport velocity vP of the value document and the sensor-specific offset parameter a of the sensor.

Correcting the measured luminescence time constant t(vP) with the aid of the sensor-specific correction factor K(vP) is effected by calculating t*(vP)=t(vP)·K(vP), as in the first exemplary embodiment.

3rd Exemplary Embodiment

In the third exemplary embodiment, the sensor-specific offset length d of the sensor is used as a sensor-specific parameter and, before delivery of the sensor, is stored in the memory area 26 of the sensor 25, together with a sensor-generally applicable offset value assignment. The sensor 25 with the offset length d stored therein and the offset value assignment is then delivered to the customer, and the customer uses this sensor to carry out the value document verification in a value document processing apparatus 1.

Figure 3:
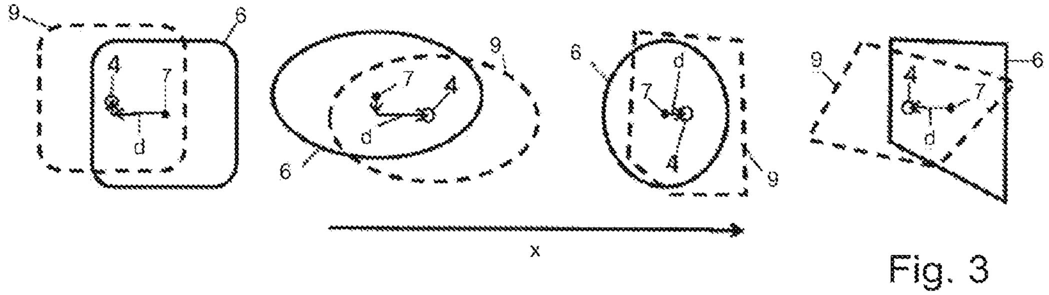
FIG. 3 shows a schematic plan view of the measurement plane of the sensor with various offset lengths d.

The sensor-specific offset length d is the distance measured along the transport direction of the value document in the measurement plane between the illumination region, in which the value document to be verified by the sensor is excited to luminescence, and the detection region, in which the sensor detects the luminescence of the value document to be verified. By way of example, the distance between the center point or centroid of the illumination region and the center point or centroid of the detection region is used as an offset length d. For elucidating the offset length d, FIG. 3 shows four possible combinations of illumination region 6 and detection region 9 and their center points or centroids 7 and 4, respectively.

In order to measure the sensor-specific offset length d of the sensor 25, on the part of the sensor manufacturer, it is possible to position a planar projection surface (screen) in the measurement plane of the sensor, which is parallel to the sensor surface and is situated at that distance from the sensor surface at which the value documents are transported past the sensor during the verification of the value documents (measurement plane). That is followed by switching on the excitation light sources of the sensor and marking the illumination region thereby illuminated on the planar projection surface. Afterward, the detection region is determined by successively illuminating only individual sections of the illumination region and taking the detected signal into consideration in each case: if a minimum signal from there is detected, the respectively illuminated section belongs to the detection region, otherwise it does not. Finally, the center point or centroid 7 of the illumination region 6 and the center point or centroid 4 of the detection region 9 are determined and marked and the distance between them along the transport direction x is measured, this distance being used as a sensor-specific offset length d.

With the aid of a plurality of reference sensors of the same type series for which different offset lengths d were determined, it is possible—analogously to the correction table T of the first exemplary embodiment—to create as an offset value assignment e.g. an offset value table D, indicating for a plurality of offset lengths d=d1, d2, . . . in each case the offset-dictated correction factor Ki(v) applicable to the respective offset length as a function of the transport velocity v of the value document, cf. table 3. Alternatively, the offset value table D can also be determined by means of mathematical simulation. The offset value table D is stored in the sensor.

TABLE 3

Offset value table D with correction factors Ki(v) for sensors of the sensor type series of the sensor 25 with different offset lengths d

| Velocity v [m/s] | 0 | 2 | 3 | 4 | 5 | 6 | 7 | 8 | 9 | 10 |
|---|---|---|---|---|---|---|---|---|---|---|
| d = −1 mm | 1.00 | 1.01 | 1.04 | 1.08 | 1.14 | 1.21 | 1.29 | 1.37 | 1.47 | 1.58 |
| d = −0.5 mm | 1.00 | 1.06 | 1.11 | 1.16 | 1.25 | 1.33 | 1.43 | 1.53 | 1.64 | 1.77 |
| d = 0 mm | 1.00 | 1.11 | 1.18 | 1.25 | 1.35 | 1.45 | 1.56 | 1.68 | 1.81 | 1.96 |
| d = +0.5 mm | 1.00 | 1.16 | 1.25 | 1.34 | 1.45 | 1.57 | 1.69 | 1.83 | 1.98 | 2.15 |
| d = +1 mm | 1.00 | 1.21 | 1.32 | 1.42 | 1.56 | 1.69 | 1.83 | 1.99 | 2.15 | 2.34 |

After the delivery of the sensor, during the value document verification on the basis of the offset value table D and on the basis of the information made available to the sensor regarding the verification transport velocity vP and on the basis of the offset length d of the sensor, the sensor-specific correction factor K(vP) is determined which is applicable to the verification transport velocity vP of the value document. Depending on the offset length d of the sensor and the verification transport velocity vP, the sensor-specific correction factor K(vP) can be taken directly from the offset value table D or can be calculated by interpolation of the table values. Correcting the luminescence time constant t(vP) with the aid of the correction factor K(vP) determined on the basis of the offset value table D is effected by calculating t*(vP)=t(vP)·K(vP), as in the first exemplary embodiment.

As an alternative to the offset value table D, a corresponding mathematical correction formula for a set of curves K(v,d) can also be produced (for instance by fitting the table values) and stored in the sensor and used for calculating K(vP) on the basis of the offset length d and the verification transport velocity vP.

The correction factors Ki(v) of the offset value table D shown in table 3 allow a complete movement-dictated correction of the luminescence time constant. As an alternative thereto, however, the offset value table D can also contain just the purely offset-dictated portion Bi(v) of these correction factors, from which the ideal correction factors K0(v) (applicable to an offset-free sensor) are worked out, cf. table 4. The purely offset-dictated correction factors Bi(v) result from the correction factors Ki(v) contained in table 3 in each case by way of division: Bi(v)=Ki(v)/K0(v). In the sensor, an offset value table D with the purely offset-dictated correction factors Bi(v) for different offset lengths d1, d2, . . . is then stored, and additionally the velocity dependence of the ideal correction factor K0(v), cf. table 1.

During the value document verification, by means of the offset length d stored in the relevant sensor, on the basis of this offset value table D, the purely offset-dictated sensor-specific correction factor B(vP) of the relevant sensor which is applicable to the verification transport velocity vP of the value document can then be selected (or calculated by interpolation).

TABLE 4

Offset value table D with purely offset-dictated correction factors Bi(v) for sensors of the sensor type series of the sensor 25 with different offset lengths d for opposite transport directions of the value document.

| Offset [mm] | Velocity [m/s] | −12 | −8 | −4 | 0 | 4 | 8 | 12 |
|---|---|---|---|---|---|---|---|---|
| −0.5 | Correction factor | 1.09 | 1.08 | 1.06 | 1.00 | 0.94 | 0.92 | 0.91 |
| 0.0 | Correction factor | 1.00 | 1.00 | 1.00 | 1.00 | 1.00 | 1.00 | 1.00 |
| 0.5 | Correction factor | 0.91 | 0.92 | 0.94 | 1.00 | 1.06 | 1.08 | 1.09 |
| 1.0 | Correction factor | 0.82 | 0.83 | 0.87 | 1.00 | 1.13 | 1.17 | 1.18 |
| 1.5 | Correction factor | 0.73 | 0.75 | 0.81 | 1.00 | 1.19 | 1.25 | 1.27 |

From the velocity dependence of the ideal correction factor K0(v), the ideal correction factor K0(vP) which is applicable to the verification transport velocity vP of the value document is correspondingly selected. In order to correct the value document time constant t(vP) with the aid of the offset-dictated correction factor B(vP) selected from the table, the two correction factors are multiplied: t*(vP)=t(vP)·B(vP)·K0(vP).

4th Exemplary Embodiment

In the fourth exemplary embodiment, a plurality of sensor-specific parameters are determined in the form of a velocity dependence of the sensor-specific correction factor K(v) and are stored in the sensor. The sensor with the velocity dependence of the sensor-specific correction factor K(v) stored therein is then used for the value document verification by means of a value document processing apparatus.

In the fourth exemplary embodiment, the velocity dependence of the sensor-specific correction factor K(v) is determined by measurement of the luminescence time constant of a reference medium at different transport velocities v with the aid of the relevant sensor specimen, in which the velocity dependence of the sensor-specific correction factor is then stored.

In order to determine the velocity dependence of the sensor-specific correction factor, each sensor specimen is calibrated in a specific manner with the aid of a reference medium which is transported past the respective sensor specimen at different transport velocities v0, v1, . . . . This can be carried out before delivery of the sensor on the part of the sensor manufacturer, e.g. at a sensor measuring station suitable for this purpose, or only upon or after the start-up of the sensor in the respective value document processing apparatus. In this case, the specified luminescence time constant tR0 of the reference medium preferably corresponds to the target value of the luminescence time constant t0 of the value documents to be verified.

For each transport velocity v at which the reference medium is transported past the respective sensor 25, a temporally resolved measurement of the luminescence emitted by the reference luminescent material is detected by the photodetector 20 of the sensor. From the measured change over time in the luminescence of the reference medium, a reference medium time constant tR(v) of the reference luminescent material is in each case determined for the respective transport velocity v. On the basis of the respectively determined reference medium time constant tR(v) of the reference luminescent material and on the basis of the specified luminescence time constant tR0 of the reference luminescent material, a sensor-specific correction factor K(v) is in each case determined for the respective transport velocity v1, v2, e.g. the relationship K(v0)=tR0/tR(v0), K(v1)=tR0/tR(v1), . . . . The respective sensor-specific correction factor K(v) is assigned to the respective transport velocity v0, v1, . . . , as is shown e.g. in table 5. In this example, the sensor specimen **25*a* was used to determine the luminescence time constant of a reference medium which is provided with a reference luminescent material having a time constant of tR0=250 μs and is transported past the sensor specimen 25*a*** at the velocities v=0 m/s to v=10 m/s.

TABLE 5

Velocity dependence of the sensor-specific correction factor for the sensor specimen 25a

| Velocity v [m/s] | 0 | 2 | 3 | 4 | 5 | 6 | 7 | 8 | 9 | 10 |
|---|---|---|---|---|---|---|---|---|---|---|
| Correction factor K(v) | 1 | 1.12 | 1.19 | 1.27 | 1.37 | 1.47 | 1.58 | 1.70 | 1.83 | 1.99 |

The discrete assignment from table 5 for different transport velocities v0, v1, . . . forms a velocity dependence K(v) of the sensor-specific correction factor K. This velocity dependence K(v) of the sensor-specific correction factor is stored in the sensor specimen **25*a* before the value document verification, e.g. in the memory area 26**.

For the sensor specimen **25*b*, using the same reference medium, correspondingly different decay times tR(v) were determined for the respective transport velocities. Correspondingly different sensor-specific correction factors result therefrom, cf. table 6. The velocity dependence K(v) indicated in table 6 is stored in the sensor specimen 25*b***.

TABLE 6

Velocity dependence of the sensor-specific correction factor for the sensor specimen 25b

| Velocity v [m/s] | 0 | 2 | 3 | 4 | 5 | 6 | 7 | 8 | 9 | 10 |
|---|---|---|---|---|---|---|---|---|---|---|
| Correction factor K(v) | 1 | 1.02 | 1.06 | 1.11 | 1.17 | 1.24 | 1.32 | 1.40 | 1.50 | 1.61 |

As an alternative to the discrete values in table 5 and in table 6, respectively, a mathematical function can also be stored as a velocity dependence K(v) of the sensor-specific correction factor in the respective sensor, which mathematical function specifies values for the correction factor K(v) continuously in a velocity range (e.g. from 0 m/s to 12 m/s), e.g. for a third sensor specimen **25*c* a fit function G(v) that is fitted to the measured discrete values K(v0), K(v1), . . . (cf. FIG. 2*e***). The correction factor K(vP) for the verification transport velocity vP then arises simply by inserting the respective verification transport velocity vP into the fit function G(v) by way of K(vP)=G(vP).

The correction device 21 of the respective sensor contains a velocity correction which, during the verification of the luminescence of the value documents, is used for correcting the luminescence time constant t determined for the respective value document. The velocity correction has recourse to the velocity dependence K(v) of the sensor-specific correction factor stored in the respective sensor, i.e. to table 5 in the case of the sensor specimen 25*a*, to table 6 in the case of the sensor specimen 25*b*, and to the fit function G(v) in the case of the sensor specimen 25*c*. For the velocity correction of the luminescence time constant, the correction device 21 uses information regarding the verification transport velocity vP of the value documents to be verified, e.g. vP=8 m/s. This information is communicated to the sensor 25 from the control device 50 of the value document processing apparatus 1 to the sensor 25.

After the delivery of the sensor by the sensor manufacturer, value documents are verified by the sensor in a value document processing apparatus 1. For verifying the value documents, the latter are transported past the sensor specimen 25*a* at a verification transport velocity vP, for example at vP=8 m/s. It is assumed that the sensor specimen 25*a* detects a decay time of t=147 μs from a value document to be verified. With the aid of the sensor-specific correction factor K(8 m/s)=1.70 applicable to the verification transport velocity vP=8 m/s and the sensor specimen 25*a*, for the purpose of the velocity correction, the detected decay time of t=147 μs is multiplied by the sensor-specific correction factor K=1.70. This results in a corrected luminescence time constant t*(8 m/s)=t K(8 m/s)=147 μs 1.40=250 μs.

It is also possible to verify whether the verification transport velocity vP of the value documents matches one of the discrete transport velocities v0, v1, . . . in table 5 or 6, respectively, as was stored in the sensor. If a correction factor K(vP) has not been explicitly stored in the sensor for the verification transport velocity vP of the respective value document processing apparatus 1, it is possible e.g. to select which of the stored transport velocities deviates the least from the verification transport velocity vP of the value documents. The sensor-specific correction factor K(vP) assigned to this transport velocity is then used for correcting the decay time. This can be done with the reservation that the velocity deviation lies below a specific threshold, e.g. <10%. If the value documents are transported past the sensor specimen 25*a* e.g. at a verification transport velocity vP=3.25 m/s during the verification in a value document processing apparatus, then the sensor-specific correction factor K=1.19 stored for v=3 m/s is selected from table 1 and used for the correction of the detected decay time.

However, if the verification transport velocity vP of the value documents deviates more than acceptably from all the transport velocities v0, v1, . . . stored in the sensor, at least two transport velocities v1, v2 are selected from the transport velocities stored in the sensor, e.g. those deviating the least from the verification transport velocity vP, and the two sensor-specific correction factors K(v1), K(v2) assigned thereto. The sensor-specific correction factor K(vP) applicable to the verification transport velocity vP is determined from the at least two selected sensor-specific correction factors K(v1), K(v2) e.g. by interpolation.

5th Exemplary Embodiment

In the fifth exemplary embodiment, too, a plurality of sensor-specific parameters in the form of a velocity dependence of the sensor-specific correction factor K(v) are determined and are stored in the memory area 26 of the sensor 25. The sensor with the velocity dependence of the sensor-specific correction factor K(v) stored therein is then used for value document verification in a value document processing apparatus.

In the fifth exemplary embodiment, however, the velocity dependence of the sensor-specific correction factor K(v) is determined on the basis of a measurement of the luminescence time constant tR(v0) of a reference medium at only exactly one reference transport velocity v0 with the aid of this very sensor in which the velocity dependence of the sensor-specific correction factor is stored. On the basis of the specific sensor-specific correction factor K(v0)=tR(v0)/tR0 calculated therefrom, from the correction table T mentioned above, that row (that reference sensor) is selected in which, in the column for v0, the correction factor assumes the value K(v0) determined for the specific sensor. This row selected from the correction table T corresponds to the velocity dependence of the sensor-specific correction factor K(v) and is stored in the sensor. If there is not an exact match between K(v0) and a value of the correction table T in the column for v0, a row interpolated from the two closest rows can be determined and stored as a velocity dependence of the sensor-specific correction factor K(v) in the respective sensor. This can be carried out by the sensor manufacturer or after delivery of the sensor, for instance during the calibration of the sensor in the value document processing apparatus.

As an alternative to the correction table T, the velocity dependence of the sensor-specific correction factor K(v) can also be determined by way of the sensor-specific offset parameter a which is calculated by means of the formula F* on the basis of the specific sensor-specific correction factor K(v0)=tR(v0)/tR0 and the reference transport velocity v0 and the ideal correction factor K0(v0). By means of this sensor-specific offset parameter a and also on the basis of the velocity dependence of the ideal correction factor K0(v), the velocity dependence of the sensor-specific correction factor K(v) can then be calculated by means of formula F and be stored in the sensor. The sensor with the velocity dependence of the sensor-specific correction factor K(v) stored therein is then used for value document verification in a value document processing apparatus.

If e.g. the offset parameter a=−0.05 is ascertained for a specific sensor specimen, then the following velocity dependence of the sensor-specific correction factor K(v) results from the correction table T, cf. table 2, which velocity dependence is then stored in the sensor:

TABLE 7

Velocity dependence of the sensor-specific correction factor K(v) for a sensor of the sensor type series of the sensor 25 with offset parameter a = −0.05.

| Velocity v [m/s] | 0 | 2 | 3 | 4 | 5 | 6 | 7 | 8 | 9 | 10 |
|---|---|---|---|---|---|---|---|---|---|---|
| K(v) for a = −0.05 | 1.00 | 1.08 | 1.13 | 1.19 | 1.28 | 1.37 | 1.47 | 1.58 | 1.70 | 1.83 |

The correction assignment T or F respectively indicated above was ascertained for a reference medium having a luminescence time constant tR0=250 μs and is used for ascertaining the sensor-specific correction factor for the velocity correction of the luminescence time constant of value documents whose target value of the luminescence time constant lies in the range of 100 μs to 5 ms.

In addition—analogously to the correction assignment T, F—at least one further correction assignment T', F' which is applicable to value documents having a different target value of the luminescence time constant can be ascertained by means of a different reference medium having a different luminescence time constant. On the basis thereof—in addition to the velocity dependence of the sensor-specific correction factor K(v) indicated above—one or more further velocity dependences K'(v), K"(v) of the sensor-specific correction factor, each of which is applicable to a different value range of the luminescence time constant of the value documents to be verified, can also be ascertained and be stored in the sensor. By way of example, the further velocity dependence K'(v), which was ascertained for a different reference medium having a luminescence time constant tR0=110 μs, can be stored in the sensor, and is used for value documents having a target value of the luminescence time constant in the range of 60 μs to 160 μs for the purpose of ascertaining the sensor-specific correction factor for the velocity correction of the luminescence time constant of the value documents. As an alternative to using a further correction assignment T', F', the further velocity dependences K'(v), K"(v) of the sensor-specific correction factor stored in the sensor can also be ascertained by (sensor-specific) measurement of the luminescence time constant of the different reference medium (having the luminescence time constant tR0=110 μs), by means of the respective sensor, by means of the different reference medium being transported past the respective sensor at different transport velocities analogously to the 4th exemplary embodiment.

6th Exemplary Embodiment

In the sixth exemplary embodiment, too, a plurality of sensor-specific parameters in the form of a velocity dependence of the sensor-specific correction factor K(v) are determined and stored in the sensor, preferably before delivery of the sensor. The sensor with the velocity dependence of the sensor-specific correction factor K(v) stored therein is then delivered to the customer, and the customer uses this sensor to carry out the value document verification in a value document processing apparatus.

In the sixth exemplary embodiment, however, the velocity dependence of the sensor-specific correction factor K(v) is determined by measurement of the offset length d of this very sensor (i.e. sensor specimen) in which the velocity dependence of the sensor-specific correction factor is stored. On the basis of the offset length d, the velocity dependence of the sensor-specific correction factor K(v) is determined on the basis of the offset value table D (or a corresponding correction formula), by selection of the table row associated with the offset length d in the offset value table D, cf. table 3 or 4, or by interpolation of the two rows whose offset lengths are closest to the offset length d. The velocity dependence of the sensor-specific correction factor K(v) determined in this way is then stored in the memory area 26 of the sensor 25. The sensor with the velocity dependence of the sensor-specific correction factor K(v) stored therein is then delivered to the customer, and the customer carries out the value document verification.

If e.g. the offset length d=1 mm is ascertained for a specific sensor specimen, then the following velocity dependence of the sensor-specific correction factor K(v) results from the offset value table D, cf. table 3, and is then stored in the sensor:

TABLE 8

Velocity dependence of the sensor-specific correction factor K(v) for a sensor of the sensor type series of the sensor 25 with offset length d = +1 mm

| Velocity v [m/s] | 0 | 2 | 3 | 4 | 5 | 6 | 7 | 8 | 9 | 10 |
|---|---|---|---|---|---|---|---|---|---|---|
| K(v) for d = +1 mm | 1.00 | 1.21 | 1.32 | 1.42 | 1.56 | 1.69 | 1.83 | 1.99 | 2.15 | 2.34 |

If the sensor is one which, transversely with respect to the transport direction, comprises more than one measurement track in the region of the security feature to be verified, then the offset length of each individual measurement track is measured. If the correction device 21 uses measurement values of the value document from a plurality of tracks for determining the luminescence time constants of the value document, then the measured luminescence time constants can first be corrected in a measurement track-dependent manner and then be combined to form a resultant luminescence time constant t(vP). Alternatively, an effective offset length can be calculated from the individual offset lengths of the different measurement tracks. For this purpose, the offset lengths of the different measurement tracks are weighted in the way that the correction device 21 weights the luminescence time constants of the individual measurement tracks for the determination of the resultant time constants. For determining the velocity dependence of the sensor-specific correction factor K(v), this effective offset length is then used as the offset length d of the sensor.

7th Exemplary Embodiment

In the seventh exemplary embodiment, too, a plurality of sensor-specific parameters in the form of a velocity dependence of the sensor-specific correction factor K(v) are determined and stored in the sensor. The sensor with the velocity dependence of the sensor-specific correction factor K(v) stored therein is then used for the verification of value documents.

In the seventh exemplary embodiment, however, in each case a separate velocity dependence of the sensor-specific correction factor for both opposite transport directions of the value documents relative to the sensor is stored in the memory area 26 of the sensor 25. By way of example, for the transport direction in which the sensor—as viewed along the transport direction of the value documents—lies on the left-hand side of the transport path, a first velocity dependence Kl(v) of the sensor-specific correction factor is stored in the sensor (negative velocity values). Moreover for the transport direction in which the sensor—as viewed along the transport direction of the value documents—lies on the right-hand side of the transport path, a second velocity dependence Kr(v) of the sensor-specific correction factor is stored in the sensor (positive velocity values). The first velocity dependence Kl(v) of the sensor-specific correction factor is applicable to the installation position of the sensor 25 in the value document processing apparatus 1 as shown in FIG. 1. The second velocity dependence Kr(v) of the sensor-specific correction factor is applicable to a different installation position, in which the sensor 25 is installed in the value document processing apparatus 1 at the opposite side, instead of the sensor 29, cf. FIG. 1.

The following tables 9, 10 present the two velocity dependences K1(v) and Kr(v) of the sensor-specific correction factor for the third sensor specimen 25*c* of the sensor type series mentioned above.

TABLE 9

Velocity dependence Kl(v) of the sensor-specific correction factor for sensor specimen 25c in the left installation position

| Velocity v [m/s] | −12 | −8 | −4 | 0 |
|---|---|---|---|---|
| Decay time tR [μs] | 135 | 178 | 229 | 250 |
| Correction factor Kl(v) | 1.85 | 1.40 | 1.09 | 1.00 |

TABLE 10

Velocity dependence Kr(v) of the sensor-specific correction factor for sensor specimen 25c in the right installation position

| Velocity v [m/s] | 0 | 4 | 8 | 12 |
|---|---|---|---|---|
| Decay time tR [μs] | 250 | 177 | 128 | 93 |
| Correction factor Kr(v) | 1.00 | 1.41 | 1.95 | 2.69 |

Figure 2E:
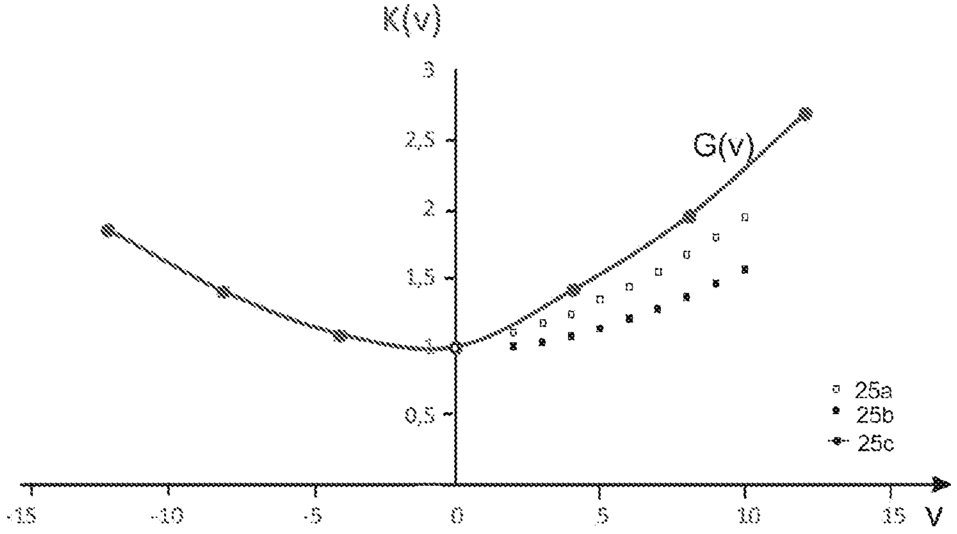
FIG. 2*e* shows a velocity dependence K(v) of the sensor-specific correction factor for the first and second sensor specimens and as a mathematical function G(v) for two opposite transport directions for a third sensor specimen.

FIG. 2*e* shows a mathematical function G(v), which was determined on the basis of the two velocity dependences K1(v) and Kr(v) for the third sensor specimen 25*c*. For comparison, the sensor-specific correction factors for the sensor specimens 25*a* and 25*b* are also depicted in FIG. 2*e*.

In order to determine the velocity dependence of the sensor-specific correction factor K(v), the procedure as in the fourth, fifth or sixth exemplary embodiment can be adopted, but for both mutually opposite transport directions of the value document relative to the sensor. For example, analogously to the fourth exemplary embodiment, in order to determine K1(v) and Kr(v) for the respective sensor specimen, the reference medium (having a known specified luminescence time constant tR0) can be correspondingly transported past the sensor along both opposite transport directions at different transport velocities v0, v1, . . . and the decay time tR1(v0), tR1(v1), tRr(v0), tRr(v1), . . . can in each case be determined. The respective measured decay times are then used to determine the sensor-specific correction factors K1(v0), K1(v1), Kr(v0), Kr(v1), . . . for a plurality of transport velocities v0, v1, . . . along the first transport direction and along the second transport direction. The sensor-specific correction factors correspondingly arise by means of forming the relationship: K1(v0)=tR0/tR1(v0), K1(v1)=tR0/tR1(v1), . . . , Kr(v0)=tR0/tRr(v0), Kr(v1)=tR0/tRr(v1), . . . .

In order to select the correct one of the two velocity dependences K1(v) or Kr(v) during the verification of the value documents, the correction device 21 acquires information regarding the verification transport direction of the value documents relative to the sensor, e.g. from the control device 50, which also communicates the information regarding the verification transport velocity vP. The information regarding the verification transport direction can be communicated by the control device explicitly or else simply by way of the sign of the transport direction, e.g. negative velocity values for the transport direction shown in FIG. 1 (or when the sensor 25 is in the left installation position), and positive velocity values for the opposite transport direction (or when the sensor is in the right installation position). The correction device 21 then selects either the first velocity dependence of the correction factor K1(v) or the second velocity dependence of the correction factor Kr(v) depending on the information made available to the sensor 25 regarding the verification transport direction. On the basis of the selected first or respectively second velocity dependence of the sensor-specific correction factor K1(v), Kr(v) and by means of the information made available to the sensor regarding the verification transport velocity vP, the correction device 21 determines the sensor-specific correction factor K1(vP) or Kr(vP) which is applicable to the verification transport velocity vP and the verification transport direction of the value documents. The luminescence time constant t(vP) of the value documents that is detected by the sensor 25 is then corrected with the aid of the sensor-specific correction factor K1(vP) or respectively Kr(vP) applicable to the verification transport velocity vP and to the verification transport direction of the value documents, e.g. t*(vP)=t(vP)·K1(vP) in the case of the left installation position from FIG. 1 or respectively t*(vP)=t(vP)·Kr(vP) in the case of a right installation position.

The invention claimed is:

1. A method for providing a velocity correction of a luminescence time constant of a value document in a sensor which is configured for measuring a change over time in a luminescence of the value document while the value document is transported past the sensor, and which is configured for determining the luminescence time constant of the value document on the basis of the measured change over time in the luminescence and for verifying the luminescence of the value document, comprising the following steps: a) determining at least one sensor-specific parameter on the basis of a measurement at the sensor or on the basis of a measurement with the aid of the sensor, b) storing the at least one sensor-specific parameter in the sensor, c) providing the velocity correction, which, during the verification of the luminescence of the value document transported past the sensor at a verification transport velocity, is usable for correcting a luminescence time constant determined for the value document, in a correction device of the sensor, wherein the correction device, for the velocity correction of the luminescence time constant of the value document, is configured: on the basis of the at least one sensor-specific parameter stored in the sensor and by means of information made available in the sensor regarding the verification transport velocity of the value document, to determine a sensor-specific correction factor which is applicable to the verification transport velocity of the value document to be verified in each case, and to correct the luminescence time constant determined for the value document with the aid of the sensor-specific correction factor applicable to the verification transport velocity of the value document in order to determine a corrected luminescence time constant for the value document, wherein the sensor is designed to verify the luminescence of the value document on the basis of the corrected luminescence time constant.

2. The method according to claim 1, wherein a velocity dependence of a sensor-generally applicable correction factor is stored in the sensor, which velocity dependence assigns in each case a sensor-generally applicable correction factor to different possible transport velocities of the value document to be verified, and the sensor-generally applicable correction factor applicable to the verification transport velocity of the value document is used for the velocity correction of the luminescence time constant determined for the value document.

3. The method according to claim 1, wherein at least one correction assignment, in particular offset value assignment or correction table or correction formula, is stored in the sensor, which correction assignment, for different possible sensor-specific offset values of the sensor, assigns in each case an offset-dictated correction factor to in each case different possible transport velocities of the value document to be verified, and in that during the velocity correction it is provided that on the basis of the correction assignment, in particular on the basis of the offset value assignment or correction table or correction formula, with the aid of the sensor-specific parameter stored in the sensor, the sensor-specific correction factor is determined which is applicable to the sensor-specific parameter of the sensor stored in the sensor and to the verification transport velocity of the value document, and the luminescence time constant of the value document is corrected with the aid of the sensor-specific correction factor determined on the basis of the correction assignment and applicable to the verification transport velocity.

4. The method according to claim 1, wherein the correction device is configured to determine the sensor-specific correction factor applicable to the verification transport velocity depending on information made available to the sensor regarding the transport direction of the value document to be verified relative to the sensor and/or wherein the correction device is configured to determine the sensor-specific correction factor applicable to the verification transport velocity depending on information made available to the sensor regarding a target value of the luminescence time constant of the value document to be verified.

5. The method according to claim 1, wherein the sensor-specific parameter stored in the sensor is a sensor-specific offset value of the sensor, which is characteristic of a sensor-specific offset along the transport direction of the value document between an illumination region and a detection region of the sensor, in particular a sensor-specific offset length of the sensor, which indicates the distance along the transport direction of the value document between the illumination region and the detection region.

6. The method according to claim 1, wherein in step a) when determining the sensor-specific parameter, the following steps are carried out: a1) transporting a reference medium provided with a reference luminescent material past the sensor at a reference transport velocity along a transport direction, wherein the reference luminescent material has a specified luminescence time constant, and a2) measuring the change over time in the luminescence of the reference luminescent material by means of the sensor at the reference transport velocity while the reference medium is transported past, and a3) determining a reference medium time constant of the reference luminescent material for the reference transport velocity on the basis of the change over time in the luminescence of the reference luminescent material measured at the reference transport velocity, and a4) determining a specific sensor-specific correction factor applicable to the reference transport velocity on the basis of the determined reference medium time constant of the reference luminescent material and on the basis of the specified luminescence time constant of the reference luminescent material, and wherein in step b) when storing the sensor-specific parameter in the sensor, the following steps are carried out: b1) storing the specific sensor-specific correction factor applicable to the reference transport velocity as a sensor-specific parameter in the sensor or b2) storing a sensor-specific offset parameter, which was determined on the basis of the specific sensor-specific correction factor and the value of the reference transport velocity, as a sensor-specific parameter, and wherein in step c) when providing the velocity correction, the correction device, for the velocity correction of the luminescence time constant of the value document, is configured to determine, in particular to calculate, the sensor-specific correction factor which is applicable to the verification transport velocity of the value document to be verified in each case by means of information made available to the sensor regarding the verification transport velocity of the value document and on the basis of the specific sensor-specific correction factor stored in the sensor and optionally the value of the reference transport velocity stored in the sensor or on the basis of the sensor-specific offset parameter of the sensor stored in the sensor, if the verification transport velocity does not correspond to the reference transport velocity.

7. The method according to claim 6, wherein the specific sensor-specific correction factor applicable to the reference transport velocity and the value of the reference transport velocity have been/are stored in the sensor, and for the velocity correction it is provided that on the basis of the specific sensor-specific correction factor and the value of the reference transport velocity and the sensor-generally applicable correction factor applicable to the reference transport velocity the sensor-specific offset parameter of the sensor is ascertained, and the sensor-specific correction factor which is applicable to the verification transport velocity of the value document is determined on the basis of the ascertained sensor-specific offset parameter of the sensor, wherein the sensor-specific offset parameter of the sensor is calculated on the basis of the specific sensor-specific correction factor and the value of the reference transport velocity and the ideal correction factor applicable to the reference transport velocity, in particular with the aid of the following calculation formula:

$$a=(K(v0)-K0(v0))/(K0(v0)\cdot \arctan(v0/3)).$$

8. The method according to claim 6, wherein a correction table has been/is stored in the sensor, which correction table indicates for a plurality of possible offset parameters in each case the offset-dictated correction factor applicable to the offset parameter as a function of the transport velocity of the value document, and in that during the velocity correction it is provided that in order to ascertain the sensor-specific correction factor applicable to the verification transport velocity the sensor-specific correction factor which is applicable to the verification transport velocity of the value document and the sensor is determined on the basis of the correction table, and the luminescence time constant of the value document is corrected with the aid of the sensor-specific correction factor determined on the basis of the correction table.

9. The method according to claim 6, wherein in the sensor the velocity dependence of the sensor-generally applicable correction factor has been/is stored, and the sensor-specific offset parameter has been/is stored or, for the velocity correction, is determined from the specific sensor-specific correction factor, and a correction formula has been/is stored, which is designed for calculating the sensor-specific correction factor on the basis of the sensor-specific offset parameter and also on the basis of the verification transport velocity of the value document and on the basis of the sensor-generally applicable correction factor applicable to the verification transport velocity of the value document, and in that during the velocity correction it is provided that the sensor-generally applicable correction factor applicable to the verification transport velocity of the value document is determined on the basis of the velocity dependence of the sensor-generally applicable correction factor, and by means of the correction formula, the sensor-specific correction factor of the sensor applicable to the verification transport velocity is calculated on the basis of the sensor-generally applicable correction factor applicable to the verification transport velocity of the value document, and the sensor-specific offset parameter of the sensor and the value of the verification transport velocity of the value document, for example by means of the correction formula $$K(vP)=(K0(vP)\cdot(1+a\cdot\arctan(vP/3))).$$

10. The method according to claim 6, wherein determining the sensor-specific parameter in accordance with steps a1) to a4) is carried out at the sensor successively for a plurality of different reference transport velocities of the reference medium, wherein for each of the reference transport velocities in each case a specific sensor-specific correction factor is determined for the respective reference transport velocity on the basis of a respectively determined reference medium time constant of the reference luminescent material and on the basis of the specified luminescence time constant of the reference luminescent material, the velocity dependence of the sensor-specific correction factor is determined from the specific sensor-specific correction factors of the different reference transport velocity, and the velocity dependence of the sensor-specific correction factor applicable to the sensor is stored in the sensor.

11. The method according to claim 1, wherein the method is carried out for a plurality of sensor specimens of the same sensor type series, wherein the sensor-specific parameter, in particular the specific sensor-specific correction factor or the sensor-specific offset value, is determined in a manner specific to each sensor specimen and is stored in the respective sensor specimen.

12. The method according to claim 1, wherein a velocity dependence of the sensor-specific correction factor is stored in the sensor, which velocity dependence assigns in each case a sensor-specific correction factor applicable to the transport velocity to different possible transport velocities of the value document, and in that in step c) when providing the velocity correction, the correction device for the velocity correction of the luminescence time constant of the value document is configured, on the basis of the velocity dependence of the sensor-specific correction factor stored in the sensor and by means of information made available to the sensor regarding the verification transport velocity of the value document, to determine the sensor-specific correction factor which is applicable to the verification transport velocity of the value document.

13. A sensor for verifying a value document which, for verification, is transported past the sensor along a transport direction at a verification transport velocity, wherein the sensor comprises at least one excitation light source for exciting a luminescence of the value document, and comprises at least one photodetector for detecting the luminescence of the value document excited by the excitation light source, is configured for measuring the change over time in the luminescence of the value document while the value document is transported past the sensor, by means of the at least one photodetector, and comprises an evaluation device configured to determine a luminescence time constant of the value document at the verification transport velocity on the basis of the measured change over time in the luminescence of the value document, and comprises a correction device, in which is provided a velocity correction for correcting the luminescence time constant determined for the value document, and wherein at least one sensor-specific parameter is stored in the sensor, and wherein the correction device, for correcting the luminescence time constant of the value document transported past the sensor at the verification transport velocity, is configured, on the basis of the at least one sensor-specific parameter stored in the sensor and by means of information made available to the sensor regarding the verification transport velocity, to determine a sensor-specific correction factor which is applicable to the verification transport velocity of the value document, and wherein the sensor, in particular the correction device or the evaluation device of the sensor, is configured to correct the luminescence time constant determined for the value document with the aid of the at least one sensor-specific correction factor applicable to the verification transport velocity of the value document, in order to determine a corrected luminescence time constant for the value document, and wherein the sensor, in particular the evaluation device of the sensor, is configured to verify the luminescence of the value document on the basis of the corrected luminescence time constant.

14. The sensor according to claim 13, wherein the method was carried out at the sensor, wherein the sensor, in particular the correction device of the sensor, contains the velocity correction.

15. The sensor according to claim 13, wherein the sensor-specific parameter stored in the sensor is a sensor-specific offset value of the sensor, which is characteristic of the sensor-specific offset along the transport direction of the value document between an illumination region and a detection region of the sensor, in particular a sensor-specific offset length of the sensor, which indicates the distance along the transport direction of the value document between the illumination region and the detection region, and/or wherein the sensor-specific parameter stored in the sensor is a specific sensor-specific correction factor which is applicable specifically to the sensor and to a reference transport velocity of the value document.

16. The sensor according to claim 13, wherein at least one correction assignment, in particular offset value assignment or correction table or correction formula, is stored in the sensor, which correction assignment, for different possible sensor-specific offset values of the sensor, assigns in each case an offset-dictated correction factor to in each case different possible transport velocities of the value document to be verified, and in that during the velocity correction it is provided that on the basis of the correction assignment, in particular offset value assignment or correction table or correction formula, with the aid of the sensor-specific parameter stored in the sensor, the sensor-specific correction factor is determined which is applicable to the sensor-specific parameter of the sensor stored in the sensor and to the verification transport velocity of the value document, and the luminescence time constant is corrected with the aid of the sensor-specific correction factor determined on the basis of the correction assignment and applicable to the verification transport velocity.

17. The sensor according to claim 13, wherein at least one velocity dependence, of the sensor-specific correction factor is stored in the sensor, which velocity dependence assigns in each case a sensor-specific correction factor to different transport velocities, and the correction device for correcting the luminescence time constant of the value document transported past the sensor at the verification transport velocity is configured, by means of the information made available to the sensor regarding the verification transport velocity, on the basis of the velocity dependence of the sensor-specific correction factor stored in the sensor, to determine the sensor-specific correction factor which is applicable to the verification transport velocity of the value document.

18. The sensor according to claim 13, wherein the correction device is configured to determine the sensor-specific correction factor applicable to the verification transport velocity depending on information made available to the sensor regarding the verification transport direction of the value document to be verified relative to the sensor.

19. The sensor according to claim 13, wherein the correction device is configured to determine the sensor-specific correction factor applicable to the verification transport velocity depending on information made available to the sensor regarding a target value of the luminescence time constant of the value document to be verified.

20. An apparatus for processing value documents comprising a sensor according to claim 13, and a transport device for transporting the value document to be verified in each case past the sensor along a transport direction at a verification transport velocity.

21. A method for verifying value documents by means of the sensor according to claim 13, wherein the following steps are carried out:

A) transporting a value document to be verified past the sensor along a transport direction at a verification transport velocity and measuring the change over time in the luminescence of the value document by means of the sensor while said value document is transported past, B) making available information regarding the verification transport velocity of the value document in the sensor, C) determining a sensor-specific correction factor which is applicable to the verification transport velocity of the value document on the basis of the sensor-specific parameter stored in the sensor and by means of the information made available to the sensor regarding the verification transport velocity, D) determining a luminescence time constant of the value document at the verification transport velocity on the basis of the measured change over time in the luminescence of the value document, E) correcting the luminescence time constant of the value document with the aid of the sensor-specific correction factor applicable to the verification transport velocity of the value document in order to determine a corrected luminescence time constant for the value document, F) verifying the value document on the basis of the corrected luminescence time constant.

* * * * *